(12) United States Patent
Deguchi et al.

(10) Patent No.: US 9,577,283 B2
(45) Date of Patent: Feb. 21, 2017

(54) ENERGY STORAGE BATTERY

(75) Inventors: Hiroshige Deguchi, Kyoto (JP); Lan Huang, Kyoto (JP); Yuki Uemura, Kyoto (JP); Shosuke Yamanouchi, Kyoto (JP)

(73) Assignee: NISSIN ELECTRIC CO., LTD., Kyoto (JP)

( * ) Notice: Subject to any disclaimer, the term of this patent is extended or adjusted under 35 U.S.C. 154(b) by 116 days.

(21) Appl. No.: 14/388,246

(22) PCT Filed: May 1, 2012

(86) PCT No.: PCT/JP2012/061546
§ 371 (c)(1),
(2), (4) Date: Sep. 26, 2014

(87) PCT Pub. No.: WO2013/164879
PCT Pub. Date: Nov. 7, 2013

(65) Prior Publication Data
US 2015/0214565 A1    Jul. 30, 2015

(51) Int. Cl.
*H01M 8/20* (2006.01)
*H01M 8/18* (2006.01)
*H01M 4/60* (2006.01)

(52) U.S. Cl.
CPC .............. *H01M 8/20* (2013.01); *H01M 4/604* (2013.01); *H01M 8/188* (2013.01); *Y02E 60/528* (2013.01)

(58) Field of Classification Search
CPC .......... H01M 8/20; H01M 8/18; H01M 8/188; H01M 4/60; H01M 4/604
See application file for complete search history.

(56) References Cited

U.S. PATENT DOCUMENTS

| 4,362,791 A | 12/1982 | Kaneko et al. |
| 4,591,453 A | 5/1986 | Kobayashi |
| 2001/0028977 A1 | 10/2001 | Kazacos et al. |

(Continued)

FOREIGN PATENT DOCUMENTS

| CN | 101047261 | 10/2007 | |
| CN | 101047261 A | * 10/2007 | ............ H01M 12/00 |

(Continued)

OTHER PUBLICATIONS

"International Search Report (From PCT/ISA/210)", mailed on Jul. 3, 2012, with English translation thereof, p. 1-p. 3 in which the listed references (Foreign Patent Documents Cite No. 2, 4, 5) were cited.

(Continued)

*Primary Examiner* — Karie O'Neill Apicella
(74) *Attorney, Agent, or Firm* — Jianq Chyun IP Office

(57) ABSTRACT

A redox flow battery is described, mainly including a charge/discharge cell, a cathode electrolyte tank, and an anode electrolyte tank. The inside of the charge/discharge cell is divided into a cathode cell and an anode cell by a diaphragm. A collector plate and a cathode are contained in the cathode cell. An aqueous solution containing a Mn-polyethyleneimine complex is supplied from the cathode electrolyte tank to the cathode through a supply pipe. Thereby, an energy storage battery that has durability sufficient for practical applications in a wide range of fields can be provided.

11 Claims, 8 Drawing Sheets

(56) References Cited

U.S. PATENT DOCUMENTS

| | | | |
|---|---|---|---|
| 2002/0122980 A1* | 9/2002 | Fleischer | H01M 4/60 429/213 |
| 2011/0189549 A1 | 8/2011 | Sun et al. | |

FOREIGN PATENT DOCUMENTS

| | | |
|---|---|---|
| CN | 102089918 | 6/2011 |
| CN | 102341946 | 2/2012 |
| JP | 56-042970 | 4/1981 |
| JP | 57-009073 | 1/1982 |
| JP | 11-158271 | 6/1999 |
| JP | 2009-231230 | 10/2009 |
| WO | 2008009993 | 1/2008 |
| WO | 2011111254 | 9/2011 |

OTHER PUBLICATIONS

Iwanami Dictionary of Physics and Chemistry, 5th ed., Feb. 20, 1998 (1st printing), pp. 223, Iwanami Shoten, with Partial English Translation thereof.

Takashi Shirakashi, "Study of Equilibrium and Rate on Ethylenediaminetetraacetatomanganate(III) Complex", Abstract of PhD dissertation for Graduate School of Science (doctoral course), Tohoku University, Degree conferred on Mar. 25, 1969, with Partial English Translation thereof.

MSDS/Reagents Homepage, "http://www.wako-chem.co.jp/siyaku/msds.htm", Product Safety Data Sheet of Polyethyleneimine by Wako Pure Chemical Industries, Ltd., Retrieved Date: Mar. 27, 2012, with Partial English Translation thereof.

MSDS/Reagents Homepage, "http://www.wako-chem.co.jp/siyaku/msds.htm", Product Safety Data Sheet of Ethylenediamine by Wako Pure Chemical Industries, Ltd., Retrieved Date: Mar. 27, 2012, with Partial English Translation thereof.

"Search Report of European Counterpart Application", issued on Nov. 18, 2015, p. 1-p. 6.

"1st Office Action of China Counterpart Application", with English translation thereof, issued on Nov. 3, 2015, P. 1-P. 15.

"Office Action of China Counterpart Application" with English translation, issued on Jul. 12, 2016, p. 1-p. 7.

* cited by examiner

ENERGY STORAGE BATTERY

CROSS-REFERENCE TO RELATED APPLICATION

This application is a 371 application of the International PCT application serial no. PCT/JP2012/061546, filed on May 1, 2012. The entirety of the above-mentioned patent application is hereby incorporated by reference herein and made a part of this specification.

BACKGROUND OF THE INVENTION

Field of the Invention

The invention relates to an energy storage battery, such as a redox flow battery.

Description of the Related Art

At present, energy storage is mainly performed using pumped-storage power generation. However, since construction of a pumped-storage power station involves limitations on site conditions, new energy storage techniques, particularly secondary batteries being highly technically and economically feasible, have been actively studied. In recent years, redox flow batteries have received attention as secondary batteries.

Conventionally, there have been proposed various electrolytes for use in a redox flow battery. For example, Patent Document 1 proposes a configuration in which the anode electrolyte is an aqueous solution containing an iron-based redox material as an anode active material, and also containing a chelating agent or complexing agent for shifting a potential to the negative side. Also, in recent years, for example, there is proposed a configuration in which the cathode electrolyte is an aqueous solution containing a manganese-based redox material as a cathode active material.

However, manganese oxides are known to have strong oxidizing power to decompose (oxidize) a wide range of organic substances in water. Hence, potassium permanganate, a kind of manganese oxide, is used as an oxidant to measure the amount of organic substances in water, i.e., COD value (Non-Patent Document 1). In addition, manganese ion also has strong oxidizing power. For example, it is known that even in a state that manganese ion is complexed with a chelating agent or complexing agent to form a complex such as Mn(III)-EDTA (ethylene diamine tetraacetic acid), the ligand may be oxidized to generate $CO_2$ gas and thus cause self-decomposition of the complex (Non-Patent Document 2).

Accordingly, Patent Document 2 proposes using a chelating agent or complexing agent to prevent precipitation of a manganese compound. In addition, Patent Document 3 proposes using a chelating agent or complexing agent to improve reactivity of manganese ion in a cathode electrolyte of a microbial battery.

PRIOR-ART DOCUMENTS

Patent Documents

Patent Document 1: Japanese Unexamined Patent Application Publication No. Sho 56-42970 (published on Apr. 21, 1981)

Patent Document 2: Japanese Unexamined Patent Application Publication No. Sho 57-9073 (published on Jan. 18, 1982)

Patent Document 3: Japanese Unexamined Patent Application Publication No. 2009-231230 (published on Oct. 8, 2009)

Non-Patent Documents

Non-Patent Document 1: Iwanami Dictionary of Physics and Chemistry, $5^{th}$ ed. (published on Feb. 20, 1998, $1^{st}$ printing), p. 223, publisher: Iwanami Shoten Non-Patent Document 2: Takashi Shirakashi, "Study of Equilibrium and Rate on Ethylenediaminetetraacetatomanganate(III) Complex," Abstract of PhD dissertation for Graduate School of Science (doctoral course), Tohoku University (degree conferred on Mar. 25, 1969)

Non-Patent Document 3: "MSDS/Reagents Homepage" (http://www.wako-chem.co.jp/siyaku/msds.htm), Wako Pure Chemical Industries, Ltd., Polyethyleneimine (Serial No.: JW161783) Product Safety Data Sheet (MSDS) (created on Jul. 28, 2004; revised on May 20, 2009)

Non-Patent Document 4: "MSDS/Reagents Homepage" (http://www.wako-chem.co.jp/siyaku/msds.htm), Wako Pure Chemical Industries, Ltd., Ethylenediamine (Serial No.: JW050093) Product Safety Data Sheet (MSDS) (created on Sep. 1, 2001; revised on Oct. 14, 2010)

SUMMARY OF THE INVENTION

Problems to be Solved by this Invention

Nevertheless, in the configurations mentioned in Patent Documents 2-3, there is an inconvenience that many kinds of chelating agents or complexing agents may be decomposed due to the oxidizing power of manganese ion. If the chelating agent or complexing agent is decomposed due to the oxidizing power of the manganese ion contained in the cathode electrolyte, the redox flow battery will discharge itself, so there is a problem that energy efficiency of the redox flow battery is lowered. In addition, since the chelating agent or complexing agent is decreased, the manganese compound becomes easily precipitated, and the reactivity of manganese ion is reduced. Because of this, there is also a problem that the performance of the redox flow battery is degraded. That explains why the redox flow battery using a manganese-based redox material has not yet been commonly used in practice in a wide range of fields.

Accordingly, there is demand for an energy storage battery such as a redox flow battery or the like which uses a manganese-based redox material and has sufficient durability for practical applications in a wide range of fields.

That is to say, the invention has been achieved in light of the above problems, and its main purpose is to provide an energy storage battery such as a redox flow battery or the like which uses a manganese-based redox material and has sufficient durability for practical applications in a wide range of fields.

Means for Solving the Problems

The inventors of this application made an intensive study on a chelating agent or complexing agent resistant to (not decomposed (oxidized) by) the oxidizing power of manganese ion. As a result, it is discovered that only polyethyleneimine is capable of resisting (not decomposed (oxidized) by) the oxidizing power of manganese ion, and moreover, preventing precipitation of the manganese compound and self-discharge of an energy storage battery, thereby accomplishing this invention.

That is to say, in order to solve the above problems, the energy storage battery of this invention is a redox type energy storage battery that is characterized in that the cathode electrolyte thereof is an aqueous solution containing a manganese-based redox material as a cathode active material and also containing polyethyleneimine.

With the above configuration, the cathode electrolyte is an aqueous solution containing polyethyleneimine, and is therefore capable of preventing precipitation of the manganese compound, preventing self-discharge of the energy storage battery, and also improving the reactivity of manganese ion. Hence, with the above configuration, an energy storage battery using a manganese-based redox material and having sufficient durability for practical applications in a wide range of fields can be provided.

In the energy storage battery of this invention, the molar ratio of manganese ion to nitrogen atoms contained in polyethyleneimine is more preferably in the range of 1:1 to 1:5.

Here, the nitrogen atoms contained in polyethyleneimine refer to those contained in ethyleneimine ($-CH_2CH_2NH-$) as the basic unit. According to study of the inventors, it was proved that in the case of using the energy storage battery at around 20° C., the reactivity of manganese ion is most improved when the above molar ratio is 1:1; in the case of using the same at around 60° C., the reactivity of manganese ion is most improved when the above molar ratio is 1:5. Therefore, with the above configuration, an energy storage battery having further improved reactivity of manganese ion may be provided.

In the energy storage battery of this invention, the concentration of the manganese-polyethyleneimine complex contained in the above cathode electrolyte more preferably ranges from 0.2 mol/L to 2.5 mol/L. In addition, in the energy storage battery of this invention, the pH of the above cathode electrolyte is more preferably in a range of 2 to 7.

With the above configuration, an energy storage battery having more excellent performance may be provided.

In the energy storage battery of this invention, the above manganese-based redox material is more preferably manganese sulfate.

If the cathode electrolyte contains chlorine ion, when the manganese ion is oxidized by charging the energy storage battery, chlorine gas occurs. In addition, if the cathode electrolyte contains an organic substance, the organic substance is decomposed due to the oxidizing power of the manganese ion, and the energy storage battery discharges itself. However, the manganese sulfate contains neither chlorine ion nor organic substance, so with the above configuration, an energy storage battery generating no chlorine gas and capable of further preventing self-discharge can be provided.

In the energy storage battery according to the invention, the above cathode electrolyte is more preferably electrolytically oxidized.

For example, in a case where the manganese-based redox material is manganese sulfate (II), it is conceivable that the manganese ion formed by dissolving polyethyleneimine in an aqueous solution containing the manganese (II) sulfate is bivalent. Generally, the valence of the manganese ion changes between bivalence and trivalence during the redox reaction. Here, it is conceivable that when an aqueous solution containing bivalent manganese ion is electrolytically oxidized, most manganese ions are converted into trivalent ones (however, the exact valence (valence distribution) is unknown). Accordingly, in a cathode electrolyte obtained by electrolytically oxidizing an aqueous solution containing manganese ion, the contained manganese ion has a valence changing between trivalence and tetravalence during the redox reaction. Therefore, with the above configuration, an energy storage battery capable of further preventing precipitation of manganese compound and further preventing self-discharge of the energy storage battery, and moreover, having further improved reactivity of manganese ion can be provided.

In the energy storage battery of the invention, the above cathode electrolyte is more preferably shielded from oxygen in the atmosphere.

Although a detailed mechanism is unknown, if the cathode electrolyte is exposed to the oxygen in the atmosphere, the energy storage battery may discharge itself and cannot perform good charge/discharge thereafter. Thus, with the above configuration, an energy storage battery capable of further preventing precipitation of a manganese compound, further preventing self-discharge of the energy storage battery, and moreover, further improving reactivity of manganese ions can be provided.

In the energy storage battery of this invention, an anode electrolyte is more preferably an aqueous solution containing an iron-based redox material as an anode active material. In the energy storage battery of this invention, the above anode electrolyte is more preferably an aqueous solution containing a Fe-diethylene triamine pentaacetic acid complex. Further, in the energy storage battery of this invention, the above anode electrolyte is more preferably electrolytically oxidized.

With the above configuration, an energy storage battery having more excellent performance may be provided.

In addition, the energy storage battery of this invention is more preferably a redox flow battery.

Effects of this Invention

With this invention, an energy storage battery capable of preventing precipitation of a manganese compound, preventing its self-discharge, and also having an improved reactivity of manganese ion can be provided. Accordingly, there is an effect that an energy storage battery using a manganese-based redox material and having sufficient durability for practical applications in a wide range of fields can be provided.

DESCRIPTION OF THE EMBODIMENTS

The energy storage battery of this invention is of a redox type, and includes a cathode electrolyte that is an aqueous solution containing a manganese-based redox material as a cathode active material and also containing polyethyleneimine.

In the invention, "manganese-based redox material" refers to a compound that generates manganese ion when mixed in an aqueous solution, wherein during a redox reaction, the manganese ion has a varying valence (associated with the redox reaction) in the ionic state. The same rule also applies to the case of iron. In addition, in the invention, the description "A to B" that indicates a numerical value range means "from A to B" unless otherwise specified. Accordingly, in the invention, "pH of 2 to 7," for example, refers to that the pH ranges from 2 to 7. In addition, in the invention, "number of moles of polyethyleneimine" refers to the number of moles of nitrogen atoms contained in ethyleneimine ($-CH_2CH_2NH-$) as a basic unit. Accordingly, "1 mol of polyethyleneimine" means that the number of moles of nitrogen atoms contained in ethyleneimine (molecular weight: 43) as a basic unit is 1 mol, i.e., that the number of moles of the ethyleneimine is 1 mol (hence "1 mol of polyethyleneimine" weighs 43 g).

An embodiment according to the invention is described as follows based on FIG. 1. In the following descriptions, a redox flow battery is taken as an example of energy storage battery. However, the invention is not limited thereto, and may be carried out in modes that have been modified in various ways within the described scope.

[Redox Flow Battery]

Figure 1:
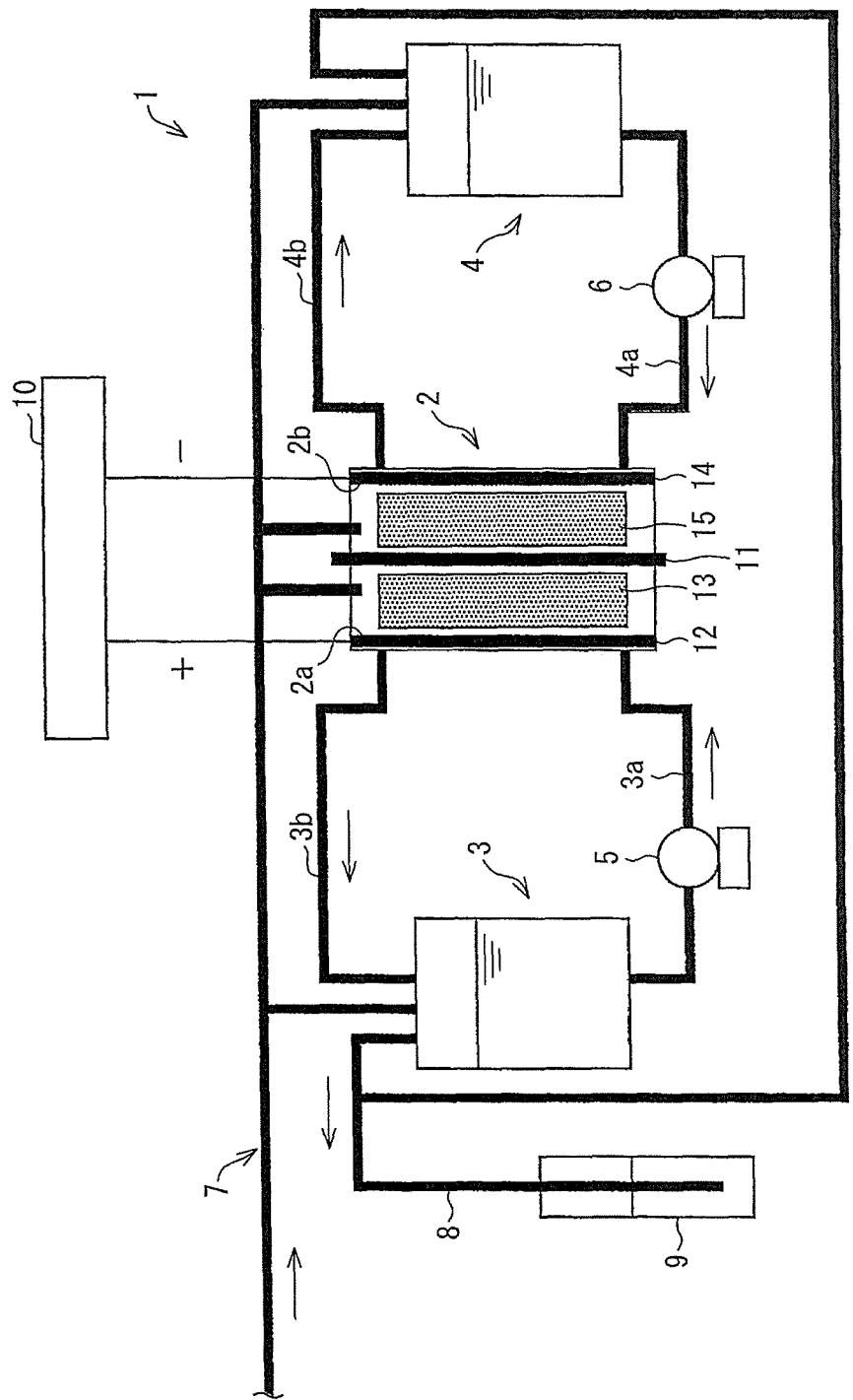
FIG. 1 is a front view showing a schematic configuration of an example of a redox flow battery according to an embodiment of this invention.

As shown in FIG. 1, a redox flow battery 1 of this embodiment mainly includes a charge/discharge cell (battery container) 2, a cathode electrolyte tank 3, and an anode electrolyte tank 4. The charge/discharge cell 2 has its inside divided into a cathode cell 2a and an anode cell 2b by a diaphragm 11 composed of, for example, an ion exchange membrane. Moreover, in the charge/discharge cell 2, in order to stabilize the capabilities (various performances) of the redox flow battery 1, a temperature regulator that maintains a constant temperature may be disposed.

The cathode cell 2a accommodates a collector plate 12 in the form of, e.g., a glassy carbon plate or the like, and a cathode 13 composed of, e.g., carbon felt. The anode cell 2b accommodates a collector plate 14 in the form of, e.g., a glassy carbon plate or the like, and an anode 15 composed of, e.g., carbon felt. The cathode 13 is impregnated with a cathode electrolyte, and the anode 15 is impregnated with an anode electrolyte. The above cathode electrolyte and anode electrolyte have a pH in a range of 2 to 7, no strong acidity, and little corrosiveness, thus being good in operatability.

The above collector plates 12 and 14 are electrically connected to a charge/discharge apparatus 10. During the discharge, a reduction reaction is performed on the cathode 13 to receive electrons, while an oxidation reaction is performed on the anode 15 to release electrons. At this moment, the collector plate 12 is configured to receive electrons from the charge/discharge apparatus 10 and supply them to the cathode 13, and the collector plate 14 is configured to collect the electrons released by the anode 15 and supply them to the charge/discharge apparatus 10. On the other hand, during the charge, an oxidation reaction is performed on the cathode 13 to release electrons, while a reduction reaction is performed on the anode 15 to receive electrons. At this moment, the collector plate 12 is configured to collect the electrons released by the cathode 13 and supply them to the charge/discharge apparatus 10, and the collector plate 14 is configured to receive the electrons from the charge/discharge apparatus 10 and supply them to the anode 15.

The cathode electrolyte tank 3 is a tank for storing the cathode electrolyte and is connected to the cathode cell 2a. That is to say, the above cathode electrolyte tank 3 is configured to supply the cathode electrolyte to the cathode 13 in the cathode cell 2a through a supply pipe 3a, and to recycle the cathode electrolyte that has passed through the cathode 13 through a recycling pipe 3b. Then, the cathode electrolyte is circulated using a pump 5 disposed on the supply pipe 3a. Moreover, the amount of the cathode electrolyte supplied per unit time relative to the cathode cell 2a during the charge/discharge or the capacity of the cathode electrolyte tank 3 only has to be set depending on the size of the charge/discharge cell 2 or the capabilities required by the redox flow battery 1, etc., and is not particularly limited.

The anode electrolyte tank 4 is a tank for storing the anode electrolyte and is connected to the anode cell 2b. That is to say, the above anode electrolyte tank 4 is configured to supply the anode electrolyte to the anode 15 in the anode cell 2b through a supply pipe 4a, and to recycle the anode electrolyte that has passed through the anode 15 through a recycling pipe 4b. Then, the anode electrolyte is circulated using a pump 6 disposed on the supply pipe 4a. Moreover, the amount of the anode electrolyte supplied per unit time relative to the anode cell 2b during the charge/discharge or the capacity of the anode electrolyte tank 4 only has to be set depending on the size of the charge/discharge cell 2 or the capabilities required for the redox flow battery 1 and so on, and is not particularly limited.

By circulating the cathode electrolyte and the anode electrolyte, the electrolyte in the charge/discharge cell 2 may be replaced. Thus, in the redox flow battery 1 according to this embodiment, long-term (so-called large-capacity) charge and discharge become possible.

To the above charge/discharge cell 2, cathode electrolyte tank 3 and anode electrolyte tank 4, an inert gas such as $N_2$ gas or the like is supplied from a gas supply apparatus (not shown) by an inert gas supply pipe 7. In this way, the above cathode electrolyte and anode electrolyte are shielded from oxygen in the atmosphere. The inert gas supplied from the inert gas supply pipe 7 is evacuated outside through an exhaust pipe 8. The tip of the exhaust pipe 8 is water-sealed by a water-seal pipe 9. Accordingly, a counterflow of the atmosphere is avoided, and air pressure in the charge/discharge cell 2, the cathode electrolyte tank 3 and the anode electrolyte tank 4 is maintained constant. Moreover, the inert gas supply pipe 7 may be configured to supply the inert gas to the gas phase part of the charge/discharge cell 2, the cathode electrolyte tank 3 and the anode electrolyte tank 4, and may also be configured to supply the inert gas by bubbling into the cathode electrolyte and the anode electrolyte.

In addition, in the redox flow battery 1 of this embodiment, the above cathode electrolyte and anode electrolyte have a pH in the range of 2 to 7, no strong acidity, and little corrosiveness, so there is great flexibility in material choice for each component constituting the redox flow battery 1. That is to say, if the cathode electrolyte and the anode electrolyte are strongly acidic, the choice of materials capable of being used as the battery container is limited (e.g., hydrolyzed plastics cannot be used). By contrast, since the cathode electrolyte and the anode electrolyte are not strongly acidic, specific examples of materials of the charge/discharge cell 2 may include: commodity plastics, or relatively cheap metals such as Sn, Al, Ti, Cu, Fe, Ni and so on. In addition, the materials of the cathode electrolyte tank 3 or the pump 5, the supply pipe 3a, the recycling pipe 3b, the anode electrolyte tank 4, the pump 6, the supply pipe 4a and the recycling pipe 4b may also include the materials exemplified above. Hence, the redox flow battery 1 may be manufactured at a relatively low cost. In addition, due to little corrosiveness, the redox flow battery 1 has a long service life compared to conventional redox flow batteries (using strongly acidic electrolytes). Accordingly, compared to that of the conventional redox flow batteries (using strongly acidic electrolytes), mass production (industrialization) of the redox flow battery 1 at relatively low cost is easy. Nevertheless, the components constituting the redox flow battery 1 are not limited to include the materials exemplified above, because they only have to consist of materials having moderate mechanical strength sufficient for maintaining the apparatus and being non-corrodible by the cathode electrolyte and the anode electrolyte.

[Negative Electrode Electrolyte]

The above anode electrolyte only has to be an aqueous solution having a pH preferably in the range of 2 to 7, more preferably in the range of 4 to 6, and containing an anode active material which is able to perform a good oxidation-reduction reaction (having a varying valence in the ionic state) under the condition of the pH of 2 to 7.

Specific examples of the anode electrolyte include: an aqueous solution containing a Fe-DTPA (diethylene triamine pentaacetic acid) complex, an aqueous solution containing a Fe-EDTA (ethylene diamine tetraacetic acid) complex, an aqueous solution containing a Fe-EGTA (O,O'-bis(2-aminoethyl)ethyleneglycol-N,N,N',N'-tetraacetic acid) complex, an aqueous solution containing a Fe-EDTA-OH (N-(2-hydroxyethyl)ethylenediamine-N,N',N'-triacetic acid) complex, an aqueous solution containing a Fe-NTA (nitrilotriacetic acid) complex, an aqueous solution containing a Cr-DTPA complex, an aqueous solution containing a Cr-EDTA complex, an aqueous solution containing a Cr-EGTA complex, an aqueous solution containing a Cr-EDTA-OH complex, an aqueous solution containing a Cr-NTA complex, an aqueous solution containing a Ti-EDTA complex, an aqueous solution containing a V-EDTA complex, an aqueous solution containing a Fe-citric acid complex, an aqueous solution containing a Cu-polyethyleneimine complex, and an aqueous solution containing a Cu-ethylenediamine complex, etc. Among them, an aqueous solution containing an Fe-based redox material as an anode active material, i.e., an aqueous solution containing a Fe-complex is more preferred, and an aqueous solution containing a Fe-DTPA complex is most preferred. A redox flow battery using an aqueous solution containing a Fe-complex as the anode electrolyte has an excellent charge/discharge reaction rate.

Further, in a case where the anode electrolyte is an aqueous solution containing a Fe-complex, the concentration of the Fe-complex in the above aqueous solution more preferably ranges from 0.2 mol/L to 2.5 mol/L, further preferably ranges from 0.3 mol/L to 2.0 mol/L, and most preferably ranges from 0.5 mol/L to 1.0 mol/L.

Further, the anode electrolyte is more preferably electrolytically oxidized. The anode electrolyte is, e.g., an aqueous solution containing a Fe-DTPA complex. In the case where the anode electrolyte is electrolytically oxidized, the complex is a Fe(II)-DTPA complex in the charged state, and is a Fe(III)-DTPA complex after release of electrons in the discharged state. With the above configuration, a redox flow battery having better performance can be provided.

In addition, the anode electrolyte may further contain, in addition to the above complexes, a well-known electrolyte (conducting salt) such as sodium sulfate ($Na_2SO_4$), sodium acetate, sodium salt of EDTA, and NaCl, etc. Moreover, a method of preparing the anode electrolyte may be a well-known method including a pH adjusting technique, and is not particularly limited. In addition, water used in the anode electrolyte is satisfactory as long as it has a purity equal to or higher than that of distilled water.

However, for an aqueous solution containing an aminopolycarboxylic acid chelating compound of Fe, Cr or the like, particularly an aminopolycarboxylic acid chelating compound of Cr, in order to enable a more complete formation of the chelating compound, i.e., complex, the aqueous solution is more preferably refluxed by heating for around 4 to 18 hours. In the case where no reflux operation is performed, there is a risk that Cr or the like may be deposited or that the energy storage battery using the aqueous solution cannot be charged. Moreover, the reflux time only has to be properly set depending on the type of ligand. The reflux may also be carried out in several separate operations.

Specific examples of the aminopolycarboxylic acid constituting the aminopolycarboxylic acid chelating compound of Fe or Cr or the like include: diethylene triamine pentaacetic acid {DTPA (sometimes referred to as DTPA(5H)); $(CH_2COOH)_2NCH_2CH_2N(CH_2COOH)CH_2CH_2N(CH_2COOH)_2$} and salts thereof, ethylene diamine tetraacetic acid {EDTA; $(CH_2COOH)_2NCH_2CH_2N(CH_2COOH)_2$} and salts thereof, O,O'-bis(2-aminoethyl)ethyleneglycol-N,N,N',N'-tetraacetic acid {EGTA; $(CH_2COOH)_2NCH_2CH_2OCH_2CH_2OCH_2CH_2N(CH_2COOH)_2$} and salts thereof, N-(2-hydroxyethyl)ethylene diamine-N,N',N'-triacetic acid {EDTA-OH; $(CH_2COOH)_2NCH_2CH_2NCH_2CH_2OH(CH_2COOH)$} and salts thereof, nitrilotriacetic acid {NTA; $N(CH_2COOH)_3$} and salts thereof, and so on. Examples of the salts of the above aminopolycarboxylic acids include alkali metal salts.

The method of preparing, e.g., an aminopolycarboxylic acid chelating compound of Fe having an inorganic compound of Fe and an aminopolycarboxylic acid as starting materials is not particularly limited, and may adopt a well-known chelation technique. Specifically, the Fe-complex may be produced by using $FeSO_4$ as a starting material (raw material) and coordinating with the aminopolycarboxylic acid as a ligand. That is to say, the preparation method for the aminopolycarboxylic acid chelated compound of Fe is not particularly limited.

Moreover, the above inorganic compound of Fe only has to be a water-soluble (having a solubility of 0.2 mol/L or more) compound suitable for performing chelation.

[Cathode Electrolyte]

The above cathode electrolyte only has to be an aqueous solution having a pH preferably in the range of 2 to 7, more preferably in the range of 3 to 6, and containing a cathode active material capable of preforming a good oxidation-reduction reaction (having a varying valence in the ionic state) under the condition of the pH of 2 to 7. In other words, it only has to be an aqueous solution containing a manganese-based redox material as a cathode active material and also containing polyethyleneimine.

The above manganese-based redox material is not particularly limited, as long as it is a compound that generates manganese ion when mixed in an aqueous solution in which during a redox reaction the manganese ion has a varying valence (associated with the redox reaction) in the ionic state. Nevertheless, it is desired that the manganese-based redox material contains neither chlorine ion nor organic substance. Specific examples of the manganese-based redox material include: manganese sulfate, potassium permanganate and so on. Among them, manganese sulfate is more preferred.

If the cathode electrolyte contains chlorine ion, when the manganese ion is oxidized by charging the redox flow battery, chlorine gas occurs. In addition, if the cathode electrolyte contains an organic substance, the organic substance is decomposed due to the oxidizing power of the manganese ion, and the redox flow battery discharges itself. However, since the above-exemplified compounds contain neither chlorine ion nor organic substance, no chlorine gas occurs, and also a self-discharge may be further prevented.

Since the polyethyleneimine is capable of resisting (not decomposed (oxidized) by) the oxidizing power of manganese ion, it serves as a chelating agent or complexing agent for manganese ion to form Mn-polyethyleneimine complex. Polyethyleneimine is often commercially available as a mixture of compounds of different polymerization degrees. In this invention, a commercial product may be suitably used. Accordingly, the polyethyleneimine may be a mixture of primary, secondary, and tertiary (branching) amine structures within a scope of not hindering formation of the Mn-complex.

The average molecular weight of the polyethyleneimine is not particularly limited, but preferably allows a water solubility (0.2 mol/L) suitable for chelation. Specifically, the average molecular weight is preferably ranges from 300 to 10000, and further preferably from 600 to 1800. The molecular weight distribution of the polyethyleneimine is not particularly limited. Nevertheless, for a stable performance, a narrower distribution is desired.

Since the cathode electrolyte contains polyethyleneimine, precipitation of a manganese compounds can be prevented, self-discharge of the redox flow battery can be prevented, and also the reactivity of manganese ion can be improved. Thus, a redox flow battery using a manganese-based redox material and having sufficient durability for practical applications in a wide range of fields can be provided.

In addition, the amount of polyethyleneimine relative to the manganese-based redox material, i.e., the molar ratio of manganese ions to nitrogen atoms contained in polyethyleneimine is more preferably in the range of 1:1 to 1:5. Here, the nitrogen atoms contained in polyethyleneimine refer to those contained in ethyleneimine ($—CH_2CH_2NH—$) as a basic unit. According to the study of the present inventors, it was proved that in a case of using the redox flow battery at around 20° C., the reactivity of the manganese ion is most improved when the above molar ratio is 1:1; in a case of using the same at around 60° C., the reactivity of the manganese ion is most improved when the above molar ratio is 1:5. Hence, with the above configuration, the reactivity of manganese ion may be further improved.

Accordingly, the above cathode electrolyte is an aqueous solution containing a Mn-polyethyleneimine complex of which the concentration in the cathode electrolyte more preferably ranges from 0.2 mol/L to 2.5 mol/L, further preferably from 0.2 mol/L to 1.5 mol/L, and most preferably from 0.5 mol/L to 1.5 mol/L.

Further, the cathode electrolyte is more preferably electrolytically oxidized. In a case where it is electrolytically oxidized, the Mn-polyethyleneimine complex is a Mn(IV)-polyethyleneimine complex after release of electrons in the charged state, and is a Mn(III)-polyethyleneimine complex in the discharged state. Specifically, e.g., in the case where the manganese-based redox material is manganese sulfate (II), it is conceivable that the manganese ion formed by dissolving polyethyleneimine in an aqueous solution containing the manganese sulfate (II) is bivalent. Generally, the valence of manganese ion varies between bivalence and trivalence during a redox reaction. Here, it is conceivable that when an aqueous solution containing bivalent manganese ions is electrolytically oxidized, most manganese ions will be converted into trivalent ones (but the exact valence (valence distribution) is unknown). Accordingly, in a cathode electrolyte obtained by electrolytically oxidizing an aqueous solution containing manganese ion, the contained manganese ion has a valence varying between trivalence and tetravalence during the redox reaction. Therefore, with the above configuration, a Mn(IV)-polyethyleneimine complex after release of electrons can be provided in the charged state, and a Mn(III)-polyethyleneimine complex may be provided in the discharged state. Thus, precipitation of a manganese compounds may be further prevented, self-discharge of the redox flow battery may be further prevented, and also the reactivity of the manganese ion may be further improved.

In addition, the cathode electrolyte may further contain, in addition to the above Mn-polyethyleneimine complex, a well-known electrolyte (conducting salt) such as $Na_2SO_4$, sodium acetate, sodium salt of EDTA, NaCl and so on. Moreover, the method of preparing the cathode electrolyte may be a well-known one using a pH adjusting technique, and is not particularly limited. Also, water used in the cathode electrolyte is satisfactory as long as it has a purity equal to or higher than that of distilled water.

Further, as mentioned above, the above cathode electrolyte is more preferably shielded from the oxygen in the atmosphere by the inert gas in the redox flow battery. Although a detailed mechanism is unknown, if the cathode electrolyte is exposed to the oxygen in the atmosphere, the redox flow battery may discharge itself and cannot perform good charge/discharge thereafter. Therefore, by shielding the cathode electrolyte from the oxygen in the atmosphere, precipitation of a manganese compound can be further prevented, self-discharge of the redox flow battery can be further prevented, and also the reactivity of manganese ions can be further improved.

[Performance of Redox Flow Battery]

A higher electromotive force is more preferred for the redox flow battery. Since in the redox flow battery of this embodiment the cathode electrolyte is an aqueous solution containing a Mn-polyethyleneimine complex in which Mn has a relatively high electromotive force, the redox flow battery may be made a redox flow battery having a high output of 1.0 V or higher.

In addition, generally, as the coulombic efficiency of the redox flow battery is increased, the energy efficiency thereof is increased and the charge/discharge cycling characteristic (reversibility) thereof is also improved. In addition, practically, the coulombic efficiency is preferably 65% or higher, and more preferably 80% or higher. Practically, the energy efficiency is preferably 40% or higher, and more preferably 60% or higher. Practically, the charge/discharge cycling characteristic (reversibility) is preferably 90% or higher. In addition, practically, the voltage efficiency is preferably 60% or higher, and more preferably 75% or higher. Practically, the electrolyte utilization proportion is preferably 28% or higher, and more preferably 55% or higher.

Since in the redox flow battery of this embodiment the cathode electrolyte is an aqueous solution containing Mn-polyethyleneimine complex, the coulombic efficiency may be made 65% or higher, and more preferably 80% or higher. In addition, the energy efficiency may be made 40% or higher, and more preferably 60% or higher. Further, the charge/discharge cycling characteristic (reversibility) may be made 90% or higher. In addition, the voltage efficiency may be made 60% or higher, and more preferably 75% or higher. The electrolyte utilization proportion may be made 28% or higher, and more preferably 75% or higher.

Also, the redox flow battery of this embodiment can withstand thousands of cycles of use, thus being suitably used as an energy storage battery. Moreover, specific calculation methods for the various performances (charge/discharge cycling characteristic (reversibility), coulombic efficiency, voltage efficiency, energy efficiency and electrolyte utilization proportion) are described in the examples in later paragraphs.

In addition, as mentioned above, in the redox flow battery of this embodiment, the cathode electrolyte and the anode electrolyte may be composed of aqueous solutions of compositions different from each other (so-called two-liquid type). Or, in order to maintain the amount (concentration) of the cathode active material existing at the cathode side and that of the anode active material existing at the anode side, the cathode electrolyte and the anode electrolyte may be composed of aqueous solutions of the same composition formed by mixing the two electrolytes (so-called premix type).

EXAMPLES

The invention is further described in details with Examples and Comparative Examples. Moreover, the technical content shown in each example may be properly combined with the technical content shown in another example for use.

Example 1

The performance of the redox flow battery was evaluated by the following method.

An anode electrolyte was prepared by the following method. Firstly, 0.02 mol (7.87 g) of DTPA(5H) and 0.1 mol (4.0 g) of NaOH were added to and dissolved in 50 ml of distilled water. Next, 0.02 mol (5.56 g) of $FeSO_4.7H_2O$ was added to and dissolved in the aqueous solution, and then 0.05 mol (7.1 g) of $Na_2SO_4$ (conducting salt) was added thereto and dissolves. Next, distilled water was added to make the total amount be 100 ml. In this way, an aqueous solution having a concentration of Fe(II)-DTPA complex of 0.2 mol/L was prepared.

Next, the resulting aqueous solution was electrolytically oxidized by the method below. The electrolytic oxidation of the aqueous solution was performed using a redox flow battery having the configuration shown in FIG. 1. However, the redox flow battery used for the electrolytic oxidation (and a later-described charge/discharge test) is a small-scale battery for testing. GFA5, a kind of carbon felt made by SGL Group, was used as the cathode and the anode, and the electrode area was made 10 $cm^2$. CMS, a kind of ion exchange membrane made by ASTOM Corporation was used as a diaphragm. SG Carbon (0.6 mm thick), a kind of glassy carbon plate made by Showa Denko K.K., was used as a collector plate. A plastic container was used as a charge/discharge cell and filled with the above cathode, anode, diaphragm and collector plate. In such state, the capacities (capacity for electrolyte) at the cathode side and anode side were each adjusted to 3 ml.

Glass containers having a capacity of 30 ml were used as the cathode electrolyte tank and the anode electrolyte tank. Silicone tubes were used as various pipes such as a supply pipe, a recycling pipe, an inert gas supply pipe, an exhaust pipe and so on. MP-1000, a microtube pump made by Tokyo Rikakikai Co., Ltd., was used as a pump. In addition, PFX200, a charge/discharge battery test system made by Kikusui Electronics, was used as a charge/discharge apparatus.

20 ml of an aqueous solution having a concentration of Fe(II)-DTPA complex of 0.2 mol/L was placed in the cathode electrolyte tank of the redox flow battery having the above configuration, and 20 ml of an aqueous solution having a concentration of $Na_2SO_4$ of 0.5 mol/L was placed in the anode electrolyte tank of the same. Then, a charge (with a total coulomb amount of 384 C) was performed at a constant current of 200 mA for 32 minutes. Before and during the charging, nitrogen gas was supplied from the inert gas supply pipe to expel oxygen from the gas phase parts of the charge/discharge cell, the cathode electrolyte tank and the anode electrolyte tank. Dissolved oxygen in the aqueous solutions was also expelled. In this way, the Fe(II)-DTPA complex contained in the aqueous solution in the cathode electrolyte tank was electrolytically oxidized to prepare an aqueous solution having a concentration of Fe(III)-DTPA complex of 0.2 mol/L, which served as the anode electrolyte. Moreover, during the charging, hydrogen gas occurred at the anode side.

Meanwhile, the cathode electrolyte was prepared by the method below. Firstly, 0.02 mol (0.86 g) of polyethyleneimine was added to and dissolved in 50 ml of distilled water. Polyethyleneimine (produced by Wako Pure Chemical Industries, Ltd.) having an average molecular weight of 600 was used as the polyethyleneimine.

Next, approximately 2 ml of dilute sulfuric acid having a concentration of 2.5 mol/L was dripped into this aqueous solution to adjust the pH to 7. Then, 0.02 mol (3.38 g) of $MnSO_4.H_2O$ was added to and dissolved in the above aqueous solution, and then 0.05 mol (7.1 g) of $Na_2SO_4$ (conducting salt) was added thereto and dissolved. Next, dilute sulfuric acid having a concentration of 2.5 mol/L was dripped thereto to adjust the pH to 6, and then distilled water was added to make the total amount 100 ml. In this way, an aqueous solution having a concentration of Mn(II)-polyethyleneimine complex of 0.2 mol/L was prepared.

Next, the above aqueous solution was electrolytically oxidized using the same method for electrolytically oxidizing the anode electrolyte. That is to say, 20 ml of an aqueous solution having a concentration of Mn(II)-polyethyleneimine complex of 0.2 mol/L was placed in the cathode electrolyte tank of the redox flow battery having the above configuration, and 20 ml of the above aqueous solution having a concentration of Fe(III)-DTPA complex of 0.2 mol/L was placed in the anode electrolyte tank of the same. Then, a charging (with a total coulomb amount of 384 C) was performed at a constant current of 200 mA for 32 min. Before and during the charging, $N_2$ gas was supplied from the inert gas supply pipe to expel oxygen from the gas phase parts of the charge/discharge cell, cathode electrolyte tank and anode electrolyte tank. Dissolved oxygen in the aqueous solutions was also expelled. In this way, the Mn(II)-polyethyleneimine complex contained in the aqueous solution in the cathode electrolyte tank was electrolytically oxidized to prepare an aqueous solution having a concentration of Mn(III)-polyethyleneimine complex of 0.2 mol/L, which served as the cathode electrolyte. However, the exact valence (valence distribution) of the electrolytically oxidized Mn-polyethyleneimine complex is unknown.

A charge/discharge test of the redox flow battery having the above configuration was done using the above cathode electrolyte and anode electrolyte under the following conditions.

Specifically, 20 ml of an aqueous solution having a concentration of Mn(III)-polyethyleneimine complex of 0.2 mol/L was placed in the cathode electrolyte tank of the redox flow battery having the above configuration, and 20 ml of the above aqueous solution having a concentration of Fe(III)-DTPA complex of 0.2 mol/L was placed in the anode electrolyte tank of the same. In the charge/discharge test, the charging (with a total coulomb amount of 240 C) was performed at a constant current of 100 mA for 40 minutes, and the discharging was performed at a constant current of 100 mA. The discharging cut-off voltage was set to 0.0 V. In addition, a charge/discharge cycle starting from charging was repeated 5 times (5 cycles). Before and during the charge/discharge test, $N_2$ gas was supplied from the inert gas supply pipe to expel oxygen from the gas phase parts of the charge/discharge cell, the cathode electrolyte tank and the anode electrolyte tank. Dissolved oxygen in the electrolytes was also expelled.

It is conceivable that the redox reaction at the cathode side is "Mn(III)-polyethyleneimine complex $\Leftrightarrow$ Mn(IV)-polyethyleneimine complex+$e^-$," and the redox reaction at the anode side is "Fe(III)-DTPA complex+$e^- \Leftrightarrow$ Fe(II)-DTPA complex."

Figure 2:
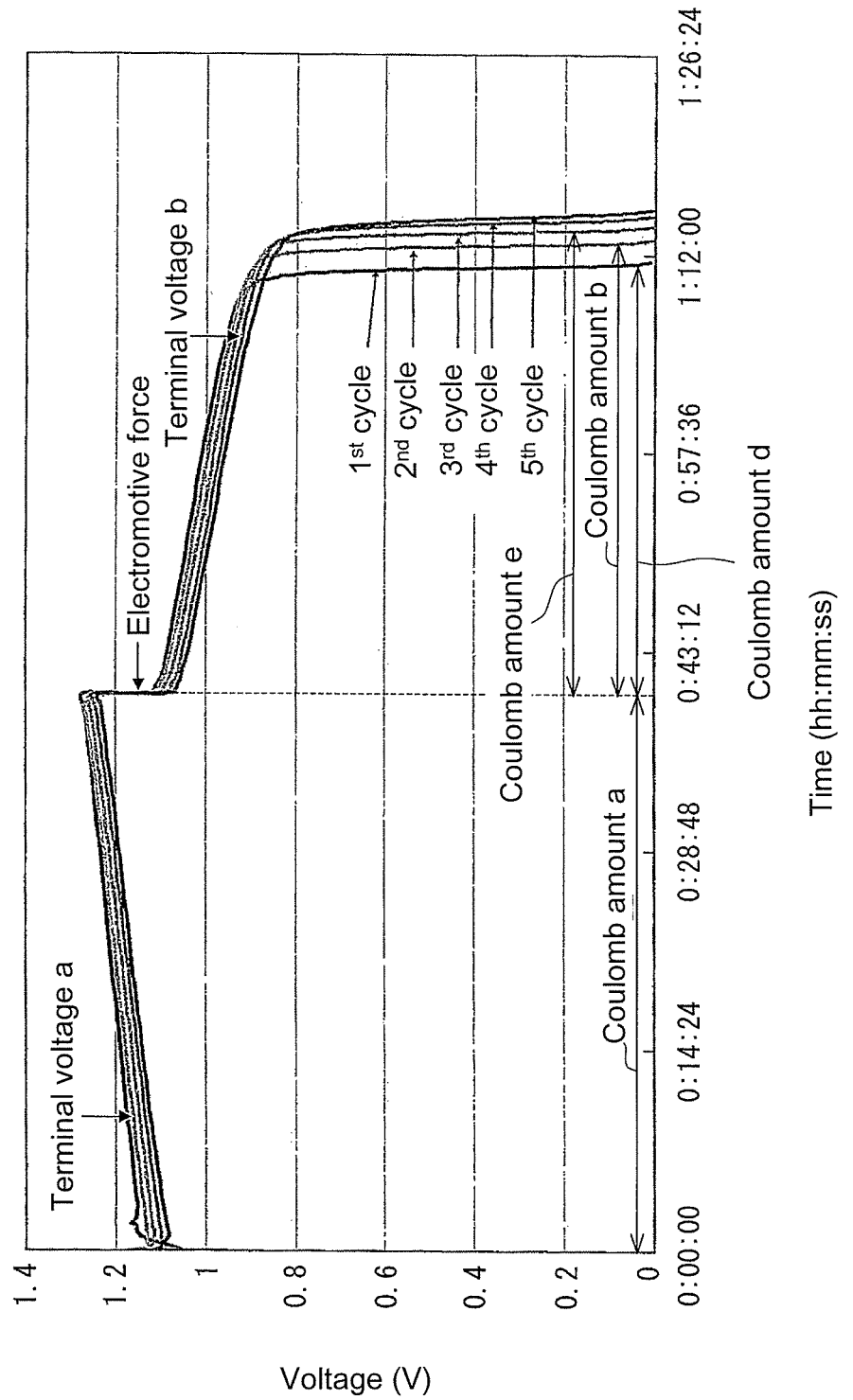
FIG. 2 is a graph showing results of a charge/discharge test in Example 1 that uses the redox flow battery according to an embodiment of this invention.

The results (transition of battery voltage) of the charge/discharge test are plotted in FIG. 2. From the figure, various performances, i.e., "charge/discharge cycling characteristic (reversibility)," "coulombic efficiency," "voltage efficiency," "energy efficiency" and "electrolyte utilization proportion," of the above redox flow battery were calculated. In addition, in the $1^{st}$ cycle of charge/discharge, the terminal voltage at which charging was switched to discharging (when the current was 0 mA) was read and designated as the "electromotive force."

The above "charge/discharge cycling characteristic (reversibility)" was calculated by obtaining a coulomb amount b during the discharging in the $2^{nd}$ cycle of charge/discharge and a coulomb amount e during the discharging in the $3^{rd}$ cycle of charge/discharge, and then using the formula "(e/b)×100"(%). Then, in a case where the calculated numerical value was 80% or more, the result was evaluated as "○" (repeated charge/discharge is possible); in a case of less than 80%, the result was evaluated as "x" (repeated charge/discharge is impossible).

The above "coulombic efficiency" was calculated by obtaining a coulomb amount a during the charging and the coulomb amount b during the discharging in the $2^{nd}$ cycle of charge/discharge, and then using a formula "(b/a)×100"(%).

The above "voltage efficiency" was calculated by obtaining an average terminal voltage a during the charging and an average terminal voltage b during the discharging in the $2^{nd}$ cycle of charge/discharge, and then using the formula "(b/a)×100"(%).

The above "energy efficiency" was calculated by obtaining an electric energy a during the charging and an electric energy b during the discharging in the $2^{nd}$ cycle of charge/discharge, and then using the formula "(b/a)×100"(%).

The above "electrolyte utilization proportion" was calculated by obtaining a coulomb amount c by multiplying the amount (number of moles) of active materials in the electrolyte supplied to the cathode or anode side by the Faraday constant (96500 C/mol), and obtaining a coulomb amount d during the discharging in the $1^{st}$ cycle of charge/discharge, and then using the formula "(d/c)×100"(%). Moreover, in a so-called two-liquid type battery, when there is a difference between the amounts of the active material in the electrolyte supplied to the cathode side and that supplied to the anode side, the smaller amount was adopted for the calculation.

As a result, the "electromotive force" was 1.2 V, the "charge/discharge cycling characteristic (reversibility)" was "○" (103%), the "coulombic efficiency" was 85%, the "voltage efficiency" was 85%, the "energy efficiency" was 72%, and the "electrolyte utilization proportion" was 53%. Accordingly, it is clear that the redox flow battery having the above configuration is suitably used as an energy storage battery.

In addition, the "electrolyte potential" was evaluated by the method below. A graphite electrode and a silver/silver chloride (in saturated KCl solution) electrode are respectively inserted into the cathode electrolyte tank and the anode electrolyte tank of the redox flow battery in advance, and then the potential of the graphite electrode relative to the silver/silver chloride (in saturated KCl solution) electrode during the charging/discharging is measured. As a result, the potential of the cathode electrolyte was 0.94 V at the end of the discharging, and 1.06 V at the end of the charging. The potential of the anode electrolyte was 0.00 V at the end of the discharging, and −0.13 V at the end of the charging.

Moreover, specific calculation methods for the various performances (charge/discharge cycling characteristic (reversibility), coulombic efficiency, voltage efficiency, energy efficiency, electrolyte utilization proportion and electrolyte potential) may be well-known methods.

Next, a self-discharge test of the redox flow battery having the above configuration was done using the above cathode electrolyte and anode electrolyte under the following conditions.

20 ml aqueous solution having a concentration of Mn(III)-polyethyleneimine complex of 0.2 mol/L was placed in the cathode electrolyte tank of the redox flow battery having the above configuration, and 20 ml of the above aqueous solution having a concentration of Fe(III)-DTPA complex of 0.2 mol/L placed in the anode electrolyte tank thereof. In addition, a graphite electrode and a silver/silver chloride (saturated potassium chloride solution) electrode were respectively inserted into the above cathode electrolyte tank and anode electrolyte tank. The self-discharge test was carried out by the following steps. A charge (with a total coulomb amount of 180 C) was performed at a constant current of 100 mA for 30 minutes. The voltage of the graphite electrode relative to the silver/silver chloride (saturated potassium chloride solution) electrode after the charging was measured. Then, the redox flow battery was left still at room temperature (about 25° C.) overnight (about 18 hours), and the voltage of the graphite electrode relative to the silver/silver chloride (saturated potassium chloride solution) electrode at that time was measured. The two voltages were compared to each other. After the charge is performed under the above conditions, it was considered that in the cathode electrolyte after charging, the Mn(III)-polyethyleneimine complex is contained at a concentration of about 0.1 mol/L, and the Mn(IV)-polyethyleneimine complex is contained at a concentration of about 0.1 mol/L (at about 50%:50%); in the anode electrolyte after charging, the Fe(III)-DTPA complex is contained at a concentration of about 0.1 mol/L, and the Fe(II)-DTPA complex is contained at a concentration of about 0.1 mol/L (at about 50%:50%). Moreover, before and during the self-discharging test, $N_2$ gas was supplied from the inert gas supply pipe to expel oxygen from the gas phase parts of the charge/discharge cell, the cathode electrolyte tank and the anode electrolyte tank. Dissolved oxygen in the electrolytes was also expelled.

As a result, the voltage of the cathode electrolyte after the charging was 1.00 V, and the voltage after an overnight standing was 1.00 V. In addition, the voltage of the anode electrolyte after the charging was −0.07 V, and the voltage after the overnight standing was −0.07 V. Accordingly, it is clear that the redox flow battery having the above configuration substantially does not, or sufficiently slowly, discharge itself.

Example 2

The anode electrolyte was prepared by the following method. Firstly, 0.02 mol (0.86 g) of a polyethyleneimine (by Wako Pure Chemical Industries, Ltd., having an average molecular weight of 600) was added to and dissolved in 50 ml of distilled water.

Next, about 3 ml of dilute sulfuric acid with a concentration of 2.5 mol/L was dripped in the aqueous solution to adjust the pH to 6. Then, 0.02 mol (3.19 g) of $CuSO_4$ was added to and dissolved in the aqueous solution, and then 0.05 mol (7.1 g) of $Na_2SO_4$ (conducting salt) was added thereto and dissolved. Next, distilled water was added to make the total amount 100 ml. In this way, an aqueous solution having a concentration of Cu(II)-polyethyleneimine complex of 0.2 mol/L was prepared. The pH value of the aqueous solution was 3.

Meanwhile, a cathode electrolyte was made by the method below. First, 0.02 mol (0.86 g) of polyethyleneimine (by Wako Pure Chemical Industries, Ltd., having an average molecular weight of 600) was added to 50 ml of distilled water and dissolved.

Next, about 3 ml of dilute sulfuric acid having a concentration of 2.5 mol/L was dripped into the resulting aqueous solution to adjust the pH to 6. Then, 0.02 mol (3.38 g) of $MnSO_4.H_2O$ was added to and dissolved in the above aqueous solution, and then 0.05 mol (7.1 g) of $Na_2SO_4$ (conducting salt) was added thereto and dissolved. Next, dilute sulfuric acid having a concentration of 2.5 mol/L was dripped thereto to adjust the pH to 5, and then distilled water was added to make the total amount 100 ml. In this way, an aqueous solution having a concentration of Mn(II)-polyethyleneimine complex of 0.2 mol/L was prepared.

Next, electrolytic oxidation and electrolytic reduction of the aqueous solution were performed using the same method as the electrolytic oxidation method in Example 1. Specifically, 15 ml of an aqueous solution having a concentration of Mn(II)-polyethyleneimine complex of 0.2 mol/L was placed in the cathode electrolyte tank of the redox flow battery having the above configuration, and 15 ml of the above aqueous solution having a concentration of Cu(II)-polyethyleneimine complex of 0.2 mol/L was placed in the anode electrolyte tank of the same. However, regarding the collector plates, pure titanium (thickness: 0.6 mm) was used for the collector plate on the cathode side, and SG Carbon (thickness: 0.6 mm), a kind of glassy carbon plate made by Showa Denko K.K., was used for the collector plate on the anode side.

Then, a charging (with a total coulomb amount of 300 C) was performed at a constant current of 100 mA for 50 minutes. Before and during the charging, $N_2$ was supplied from the inert gas supply pipe to expel oxygen from the gas phase parts of the charge/discharge cell, the cathode electrolyte tank and the anode electrolyte tank. Dissolved oxygen in the aqueous solutions was also expelled. In this way, the Mn(II)-polyethyleneimine complex contained in the aqueous solution in the cathode electrolyte tank was electrolytically oxidized to prepare an aqueous solution having a concentration of Mn(III)-polyethyleneimine complex of 0.2 mol/L, which served as the cathode electrolyte. However, the exact valence (valence distribution) of the electrolytically oxidized Mn-polyethyleneimine complex was unknown.

Meanwhile, during the charging, the Cu(II)-polyethyleneimine complex in the anode electrolyte tank was reduced to a Cu(I)-polyethyleneimine complex, and the aqueous solution accordingly became an aqueous solution of Cu(I)-polyethyleneimine complex. However, the exact valence (valence distribution) of the electrolytically reduced Cu-polyethyleneimine complex was unknown.

A charge/discharge test of a redox flow battery having the same configuration as the redox flow battery described in Example 1 was carried out using the above cathode electrolyte and anode electrolyte under the following conditions.

15 ml of an aqueous solution with a concentration of Mn(III)-polyethyleneimine complex of 0.2 mol/L was placed in the cathode electrolyte tank of the redox flow battery having the above configuration, and 15 ml of the above aqueous solution having a concentration of Cu(I)-polyethyleneimine complex of 0.2 mol/L was placed in the anode electrolyte tank of the same. In the charge/discharge test, the charging (with a total coulomb amount of 240 C) was performed at a constant current of 100 mA for 40 minutes, and the discharging was performed at a constant current of 100 mA. The discharging cut-off voltage was set to 0.0 V. Then, after a pre-test of repeating the charge/discharge cycle starting from charging 30 times (30 cycles) was carried out, as the main test, the charge/discharge cycle was repeated 20 times (20 cycles; totally 50 cycles). Moreover, before and during the charge/discharge test, $N_2$ gas was supplied from the inert gas supply pipe to expel oxygen from the gas phase parts of the charge/discharge cell, the cathode electrolyte tank and the anode electrolyte tank. Dissolved oxygen in the electrolytes was also expelled.

It is conceivable that the redox reaction at the cathode side was "Mn(III)-polyethyleneimine complex ⇔ Mn(IV)-polyethyleneimine complex+$e^-$," and the redox reaction at the anode side was "Cu(II)-polyethyleneimine complex+$e^-$ ⇔ Cu(I)-polyethyleneimine complex." It is also conceivable that a Cu(II)-polyethyleneimine complex having a concentration of 0.2 mol/L was formed (reproduced) in the pre-test.

Figure 3:
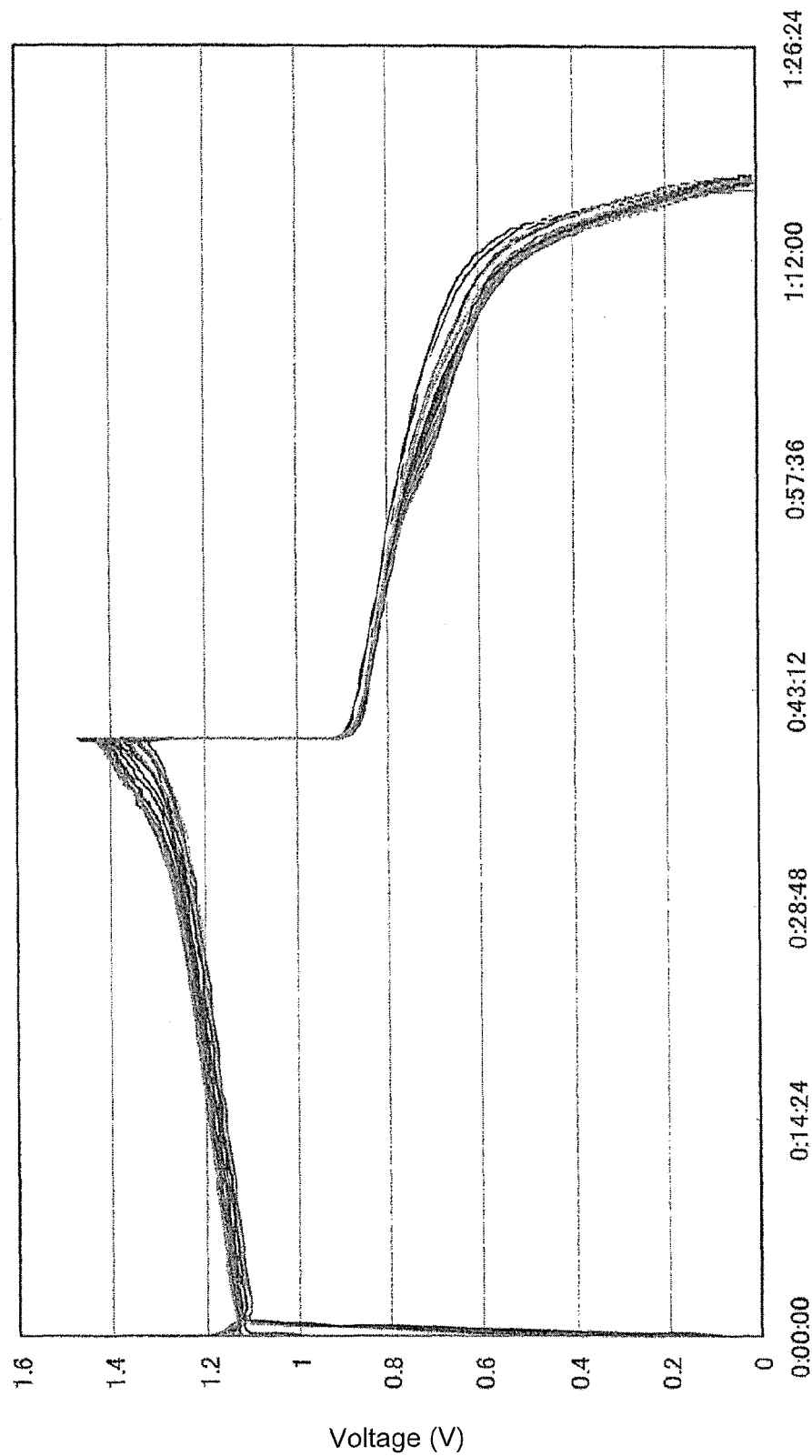
FIG. 3 is a graph showing results of a charge/discharge test in Example 2 that uses the redox flow battery according to an embodiment of this invention.

The results (transition of battery voltage) of the main test ($31^{st}$ to $50^{th}$ cycle) of the charge/discharge test are plotted in FIG. 3. From the figure, various performances, i.e., "charge/discharge cycling characteristic (reversibility)," "coulombic efficiency," "voltage efficiency," "energy efficiency" and "electrolyte utilization proportion," of the above redox flow battery were calculated as in the case of Example 1. However, the following methods were used as the calculation methods. In addition, in the $31^{st}$ cycle of charge/discharge, a terminal voltage at which charging was switched to discharging (when the current was 0 mA) was read and designated as the "electromotive force."

The above "charge/discharge cycling characteristic (reversibility)" was calculated by obtaining the coulomb amount b during the discharging in the $31^{st}$ cycle of charge/discharge and the coulomb amount e during the discharging in the $50^{th}$ cycle of charge/discharge, and then using the formula "$(e/b) \times 100$"(%).

The above "coulombic efficiency" was calculated by obtaining the coulomb amount a during the charging and the coulomb amount b during the discharging in the $50^{th}$ cycle of charge/discharge, and then using the formula "$(b/a) \times 100$" (%).

The above "voltage efficiency" was calculated by obtaining the average terminal voltage a during the charging and the average terminal voltage b during the discharging in the $32^{nd}$ cycle of charge/discharge, and then using the formula "$(b/a) \times 100$"(%).

The above "energy efficiency" was calculated by obtaining the electric energy a during the charging and the electric energy b during the discharging in the $32^{nd}$ cycle of charge/discharge, and then using the formula "$(b/a) \times 100$"(%).

The above "electrolyte utilization rate" was calculated by obtaining the coulomb amount c by multiplying the amount (number of moles) of the active material in the electrolyte supplied to the cathode or anode side by the Faraday constant, and obtaining the coulomb amount d during the discharging in the $31^{st}$ cycle of charge/discharge, and then using the formula "$(d/c) \times 100$"(%). Moreover, in the so-called two-liquid type, when there is a difference between the amounts of the active material in the electrolyte supplied to the cathode side and that supplied to the anode side, the smaller amount was adopted for the calculation.

As a result, the "electromotive force" was 1.08 V, the "charge/discharge cycling characteristic (reversibility)" was "○" (101%), the "coulombic efficiency" was 94%, the "voltage efficiency" was 55%, the "energy efficiency" was 51%, and the "electrolyte utilization proportion" was 78%. Accordingly, it is clear that the redox flow battery having the above configuration is suitably used as an energy storage battery.

In addition, the "electrolyte potential" was evaluated in the same manner as in Example 1. As a result, the potential of the cathode electrolyte was 0.94 V at the end of the discharging, and 1.06 V at the end of the charging. The potential of the anode electrolyte was 0.14 V at the end of the discharging, and 0.06 V at end of the charging.

Example 3

The performance of the redox flow battery having a changed molar ratio between manganese ions and nitrogen atoms contained in polyethyleneimine was evaluated using cyclic voltammetry by the method below. In order to evaluate the performance of the cathode electrolyte, the cyclic voltammetry having the following configuration was used as a measurement apparatus to measure (electrochemically measure) electrode characteristics of an electrode immersed in the cathode electrolyte. A schematic configuration of the cyclic voltammetry (CV) is described as follows based on FIG. 12.

Figure 12:
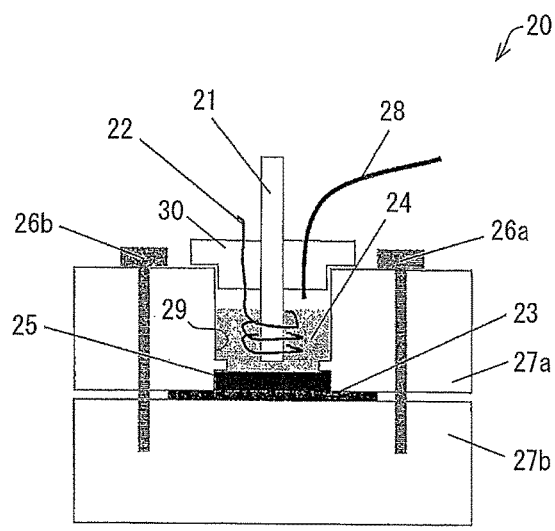
FIG. 12 is a cross-sectional view showing a schematic configuration of cyclic voltammetry as a measurement apparatus for measuring electrode characteristics of an electrode immersed in an electrolyte of the redox flow battery according to an embodiment of this invention.

As shown in FIG. 12, the cyclic voltammetry 20 was provided with a ring-shaped upper block 27a and a plate-shaped lower block 27b, both composed of fluororesin. Between the upper block 27a and the lower block 27b, an electrode 23 composed of glassy carbon (made by Tokai Carbon Co., Ltd.) was interposed as a working electrode through an O-ring 25, and a cell 29 was configured by fixing with bolts 26a and 26b. The cell 29 is filled with the cathode electrolyte as the measured electrolyte 24. The cyclic voltammetry 20 includes, in the cell 29, a reference electrode 21 composed of a silver/silver chloride (saturated potassium chloride solution) electrode and a counter electrode 22 composed of a platinum wire to be immersed in the measured electrolyte 24, and also includes a cover 30 covering the cell 29. The counter electrode 22 is wound around the reference electrode 21 at a constant interval. The cover 30 has holes for passage of the reference electrode 21, the counter electrode 22 and a tube 28 formed therein. The tube 28 is configured to supply $N_2$ gas from a supply apparatus (not shown) to above the measured electrolyte 24 in the cell 29, so as to shield the measured electrolyte 24 from the oxygen in the atmosphere by the supplied $N_2$ gas, such that the influence of the oxygen is eliminated.

The performance of the cathode electrolyte was evaluated by (electrochemically) measuring electrode characteristics of the electrode immersed in the cathode electrolyte using the cyclic voltammetry 20 with the above configuration. Specifically, the cyclic voltammetry 20 was electrically connected to an electrochemical measurement system (HZ-5000, made by Hokuto Denko Corporation). The measurement temperature was set to 20° C. or 60° C. The surface area of the electrode 23 contacting the measured electrolyte 24 was made 0.44 cm². The sweep speed (scan speed) was set to 100 mV/s. The sweep range (scan range) was set to −1.0 V to 1.5 V (relative to the silver/silver chloride (saturated potassium chloride solution) electrode). The number of times of sweep (number of repeated cycles of charge/discharge) was set to 50. Thereby, the electrode characteristics of the electrode 23 were measured.

As the above measured electrolyte, a cathode electrolyte having a molar ratio of manganese ions to nitrogen atoms contained in polyethyleneimine of 1:1 was prepared by the following method. Firstly, 0.02 mol (0.86 g) of polyethyleneimine was added to and dissolved in 50 ml of distilled water. The used polyethyleneimine (produced by Wako Pure Chemical Industries, Ltd.) had an average molecular weight of 600.

Next, about 2 ml of dilute sulfuric acid having a concentration of 2.5 mol/L was dripped into the aqueous solution to adjust the pH to 7. Thereafter, 0.02 mol (3.38 g) of $MnSO_4 \cdot H_2O$ was added to and dissolved in the aqueous solution, and then 0.05 mol (7.1 g) of $Na_2SO_4$ was added thereto and dissolved. Next, distilled water was added to make the total amount 100 ml. In this way, an aqueous solution having a molar ratio of manganese ions to nitrogen atoms contained in polyethyleneimine of 1:1 and having a concentration of Mn(II)-polyethyleneimine complex of 0.2 mol/L was prepared to serve as the cathode electrolyte a.

Figure 4:
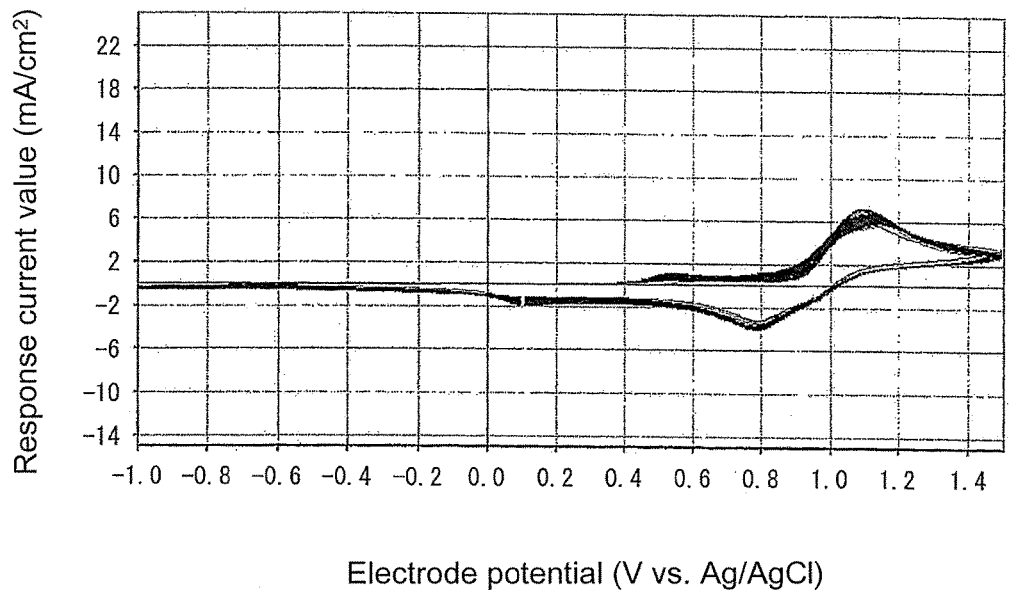
FIG. 4 is a graph showing the electrode characteristics at 20° C. of the electrode immersed in the cathode electrolyte a obtained in Example 3.
Figure 5:
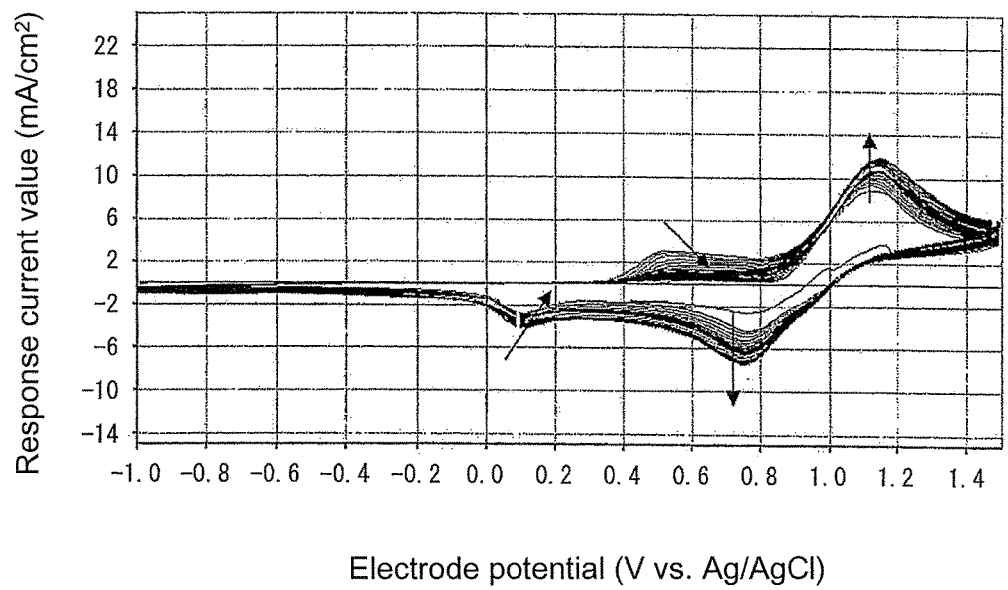
FIG. 5 is a graph showing the electrode characteristics at 60° C. of the electrode immersed in the cathode electrolyte a obtained in Example 3.

Then, electrode characteristics of the electrode immersed in the above cathode electrolyte a were measured (electrochemically measured) using the cyclic voltammetry having the above configuration under the above conditions. The obtained electrode characteristics are plotted in FIGS. 4-5. FIG. 4 is for the case where the measurement temperature was 20° C., and FIG. 5 for the case where the measurement temperature was 60° C., wherein the horizontal axis indicates electrode potential (V vs Ag/AgCl), and the vertical axis indicates the response current (mA). From the shapes of the curves (cyclic voltammogram) in the figures, the charge/discharge cycling characteristic (reversibility) of the cathode electrolyte a can be evaluated.

In the curves (cyclic voltammogram) shown in the figures having specific shapes, the lower curves represent reduction waves, and the upper curves represent oxidation waves. By sweeping the electrode potential from 1.5 V to 1.0 V, the reduction waves as the lower curves were plotted from the right side to the left side. At this moment, in the measured electrolyte 24, the Mn(IV)-polyethyleneimine complex as the oxidized complex existing in proximity to the electrode 23 was reduced to the Mn(III)-polyethyleneimine complex as the reduced complex. By contrast, by sweeping the electrode potential from −1.0 V to 1.5 V, the oxidation waves as the upper curves were plotted from the left side toward the right side. At this moment, in the measured electrolyte 24, the Mn(III)-polyethyleneimine complex as the reduced complex existing in proximity to the electrode 23 was oxidized to the Mn(IV)-polyethyleneimine complex as the oxidized complex. In addition, each response current value in the reduction waves and the oxidation was the value of a weak current occurring in the measured electrolyte 24 by virtue of the redox reaction arising in proximity to the electrode 23. In addition, from the mean value of the peak potentials (Ep) in both the reduction waves and the oxidation waves, the redox potential of the redox reaction system of the Mn-polyethyleneimine complex was known.

From the shapes of the curves plotted in the figures, it was known that the redox reaction between trivalent and tetravalent Mn-polyethyleneimine complexes was stably repeated and excellent in reproducibility.

Next, as the above measured electrolyte, a cathode electrolyte having a molar ratio of manganese ions to nitrogen atoms contained in polyethyleneimine of 1:5 was prepared by the method below. Firstly, 0.10 mol (4.30 g) of polyethyleneimine was added to and dissolved in 50 ml of distilled water. The used polyethyleneimine (by Wako Pure Chemical Industries, Ltd.) had an average molecular weight of 600.

Next, about 10 ml of dilute sulfuric acid having a concentration of 2.5 mol/L was dripped into the resulting aqueous solution to adjust the pH to 7. Thereafter, 0.02 mol (3.38 g) of $MnSO_4.H_2O$ was added to and dissolved in the above aqueous solution, and then 0.05 mol (7.1 g) of $Na_2SO_4$ was added thereto and dissolved. Next, distilled water was added to make the total amount 100 ml. In this way, an aqueous solution having a molar ratio of manganese ions to nitrogen atoms contained in polyethyleneimine of 1:5 and having a concentration of Mn(II)-polyethyleneimine complex of 0.2 mol/L was prepared to act as a cathode electrolyte b.

Figure 6:
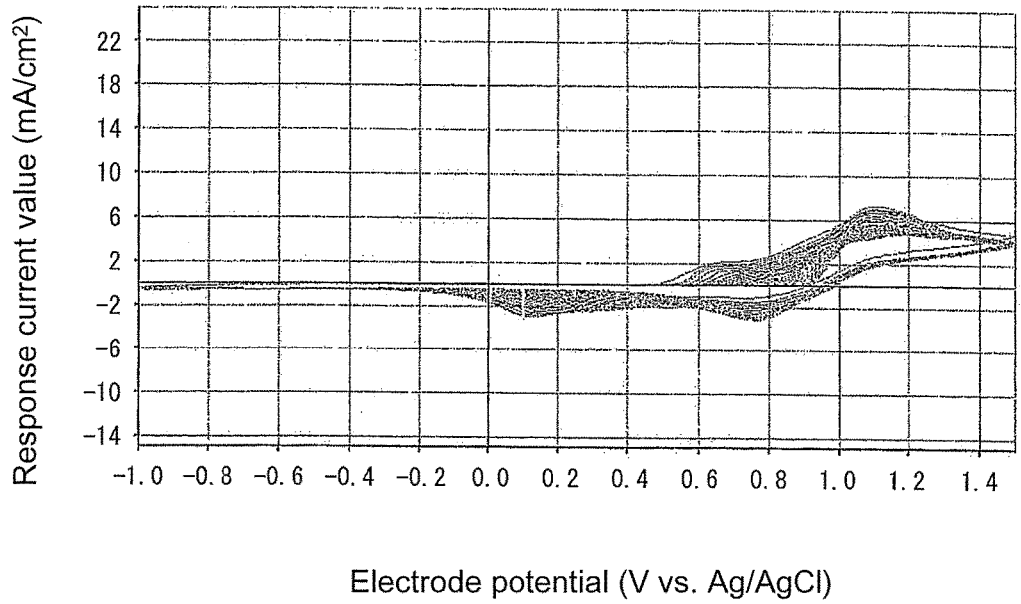
FIG. 6 is a graph showing the electrode characteristics at 20° C. of the electrode immersed in the cathode electrolyte b obtained in Example 3.
Figure 7:
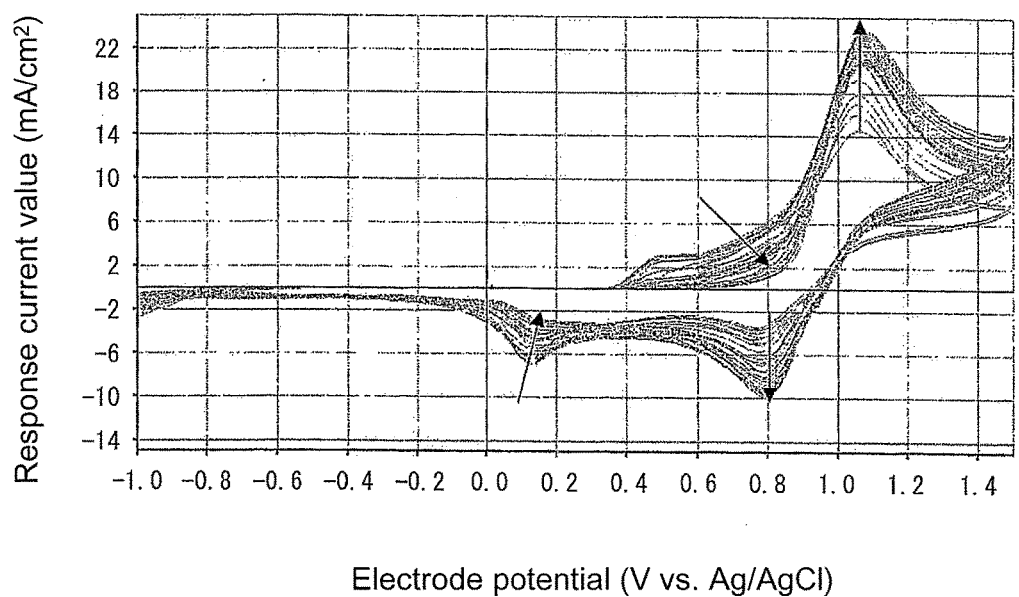
FIG. 7 is a graph showing the electrode characteristics at 60° C. of the electrode immersed in the cathode electrolyte b obtained in Example 3.
Figure 8:
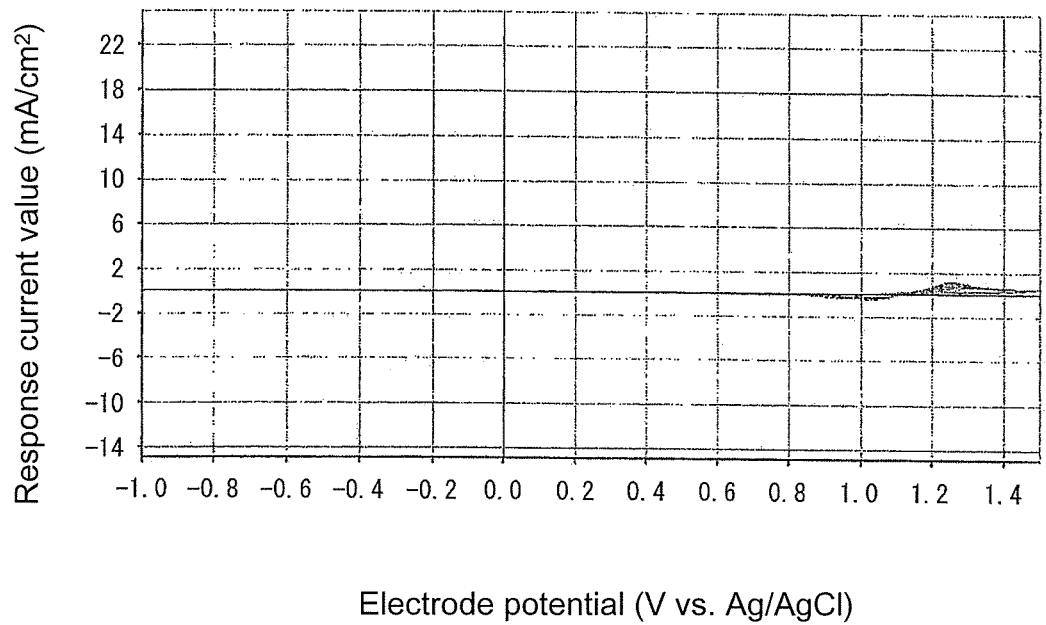
FIG. 8 is a graph showing the electrode characteristics of the electrode immersed in the cathode electrolyte c-1 obtained in Example 4.
Figure 9:
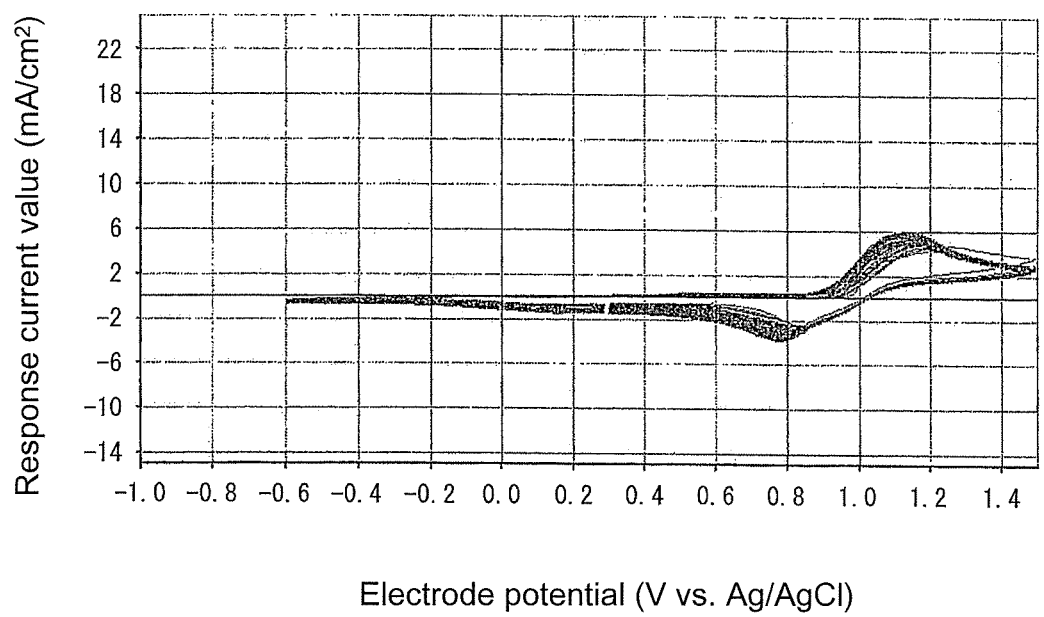
FIG. 9 is a graph showing the electrode characteristics of the electrode immersed in the cathode electrolyte c-2 obtained in Example 4.
Figure 10:
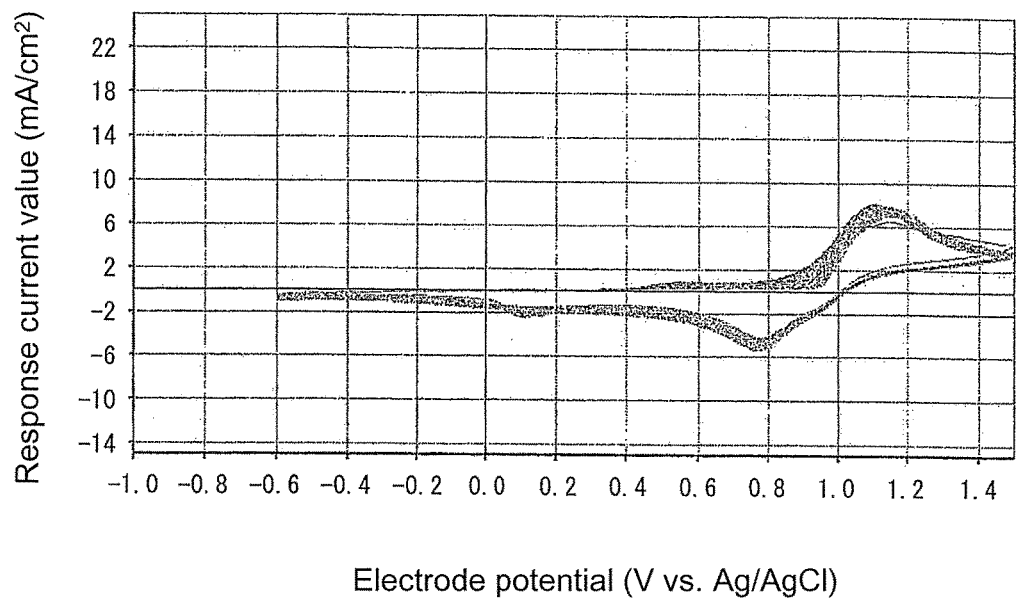
FIG. 10 is a graph showing the electrode characteristics of the electrode immersed in the cathode electrolyte c-3 obtained in Example 4.
Figure 11:
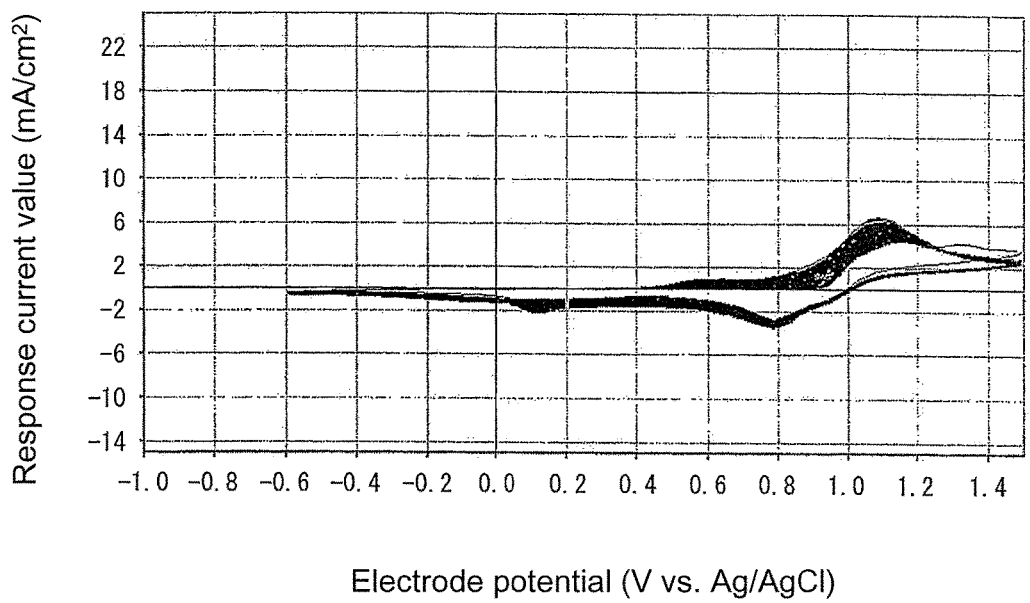
FIG. 11 is a graph showing the electrode characteristics of the electrode immersed in the cathode electrolyte c-4 obtained in Example 4.

Then, electrode characteristics of the electrode immersed in the above cathode electrolyte b were (electrochemically) measured as in the case of the cathode electrolyte a under the above conditions. The obtained electrode characteristics are plotted in FIGS. 6 and 7. FIG. 6 is for the case where the measurement temperature was 20° C., and FIG. 7 is for the case where the measurement temperature was 60° C.

From the shapes of the curves plotted in the figures, it was known that the redox reaction between trivalent and tetravalent Mn-polyethyleneimine complexes was stably repeated and excellent in reproducibility.

Then, by comparing the graph of FIG. 4 and the graph of FIG. 6, it was known that at 20° C., the cathode electrolyte a having a molar ratio of Mn-ions to N-atoms contained in polyethyleneimine of 1:1 had better charge/discharge cycling characteristic (reversibility) and was improved in the reactivity of the manganese ion. In addition, by comparing the graph of FIG. 5 and that of FIG. 7, it was known that at 60° C., the cathode electrolyte b having a molar ratio of Mn-ions to N-atoms contained in polyethyleneimine of 1:5 had a better charge/discharge cycling characteristic (reversibility) and is improved in the reactivity of the Mn-ion.

From the results of the above performance evaluation, it was known that by changing the molar ratio of Mn-ions to N-atoms contained in polyethyleneimine in the cathode electrolyte according to the working temperature (operating temperature), a redox flow battery having excellent charge/discharge cycling characteristic (reversibility) and a further improved reactivity of the manganese ion can be provided.

Example 4

The performance evaluation of a cathode electrolyte having a changed pH was performed using the same method and the same cyclic voltammetry as in Example 3.

As the measured electrolyte, a cathode electrolyte having a pH in the range of 1.28 to 6.80 was prepared as follows. Firstly, 0.02 mol (0.86 g) of polyethyleneimine was added to and dissolved in 50 ml of distilled water. The used polyethyleneimine (by Wako Pure Chemical Industries, Ltd.) had an average molecular weight of 600.

Next, about 2 ml of dilute sulfuric acid having a concentration of 2.5 mol/L was dripped into the resulting aqueous solution to adjust the pH to 7. Thereafter, 0.02 mol (3.38 g) of $MnSO_4.H_2O$ was added to and dissolved in the above aqueous solution, and then 0.05 mol (7.1 g) of $Na_2SO_4$ was added thereto and dissolved. Next, distilled water was added to make the total amount 100 ml. In this way, an aqueous solution having a concentration of Mn(II)-polyethyleneimine complex of 0.2 mol/L was prepared.

Thereafter, the aqueous solution was divided into four equal parts. To each part of the aqueous solution, dilute sulfuric acid having a concentration of 2.5 mol/L was dripped to adjust the pH to 1.28, 3.01, 5.80 or 6.80. Thereby, the cathode electrolytes c-1 to c-4 were prepared.

Then, electrode characteristics of the electrodes immersed in the above cathode electrolytes c-1 to c-4 were (electrochemically) measured using the cyclic voltammetry under the same conditions of Example 3. However, the measurement temperature was set to 20° C. The obtained electrode characteristics are plotted in FIGS. 8, 9, 10 and 11, which are respectively for the case (cathode electrolyte c-1) where the pH was 1.28, the case (cathode electrolyte c-2) where the pH was 3.01, the case (cathode electrolyte c-3) where the pH was 5.80, and the case (cathode electrolyte c-4) where the pH was 6.80.

From the shapes of the curves shown in the figures, it was known that in the cathode electrolytes c-2 to c-4 having a pH in the range of 2 to 7, the redox reaction between trivalent and tetravalent Mn-polyethyleneimine complexes was stably repeated and good in reproducibility. It was also known that in the cathode electrolyte c-1 with a pH outside the range of 2 to 7, the reactivity of the above redox reaction between trivalence and tetravalence is inferior compared to the cathode electrolytes c-2 to c-4.

From the results of the above performance evaluation, it was known that by using a cathode electrolyte having a pH in the range of 2 to 7, a redox flow battery having more excellent performance can be provided.

Example 5

The solubility of the Mn(II)-polyethyleneimine complex contained in the cathode electrolyte was determined by the following method.

Firstly, 0.02 mol (0.86 g) of polyethyleneimine was added to and dissolved in 50 ml of distilled water. The used polyethyleneimine (produced by Wako Pure Chemical Industries, Ltd.) had an average molecular weight of 600.

Next, about 2 ml of dilute sulfuric acid having a concentration of 2.5 mol/L was dripped into the resulting aqueous solution to adjust the pH to 7. Next, 0.02 mol (3.38 g) of $MnSO_4.H_2O$ was added to and dissolved in the above aqueous solution, and then distilled water was added to make the total amount 100 ml, thus preparing an aqueous solution having a molar ratio of Mn-ions to N-atoms contained in polyethyleneimine of 1:1 and having a concentration of Mn(II)-polyethyleneimine complex of 0.2 mol/L.

Then, the aqueous solution was stirred by a magnetic stirrer while water therein was evaporated away until the total amount reached 8 ml, followed by being cooled to room temperature (about 25° C.). By condensing the above aqueous solution until the total amount reached 8 ml, even though the concentration of Mn(II)-polyethyleneimine complex became 2.5 mol/L, no deposition of manganese compound was seen even at room temperature (about 25° C.). In other words, it was known that the solubility of the Mn(II)-polyethyleneimine complex is 2.5 mol/L or more, and the concentration of Mn-polyethyleneimine complex contained in the cathode electrolyte may be adjusted to 0.2 mol/L to 2.5 mol/L. In this way, it was known that a cathode electrolyte containing the Mn(II)-polyethyleneimine complex is suitably used for the redox flow battery.

Further, 0.02 mol (2.84 g) of $Na_2SO_4$ was added to the above condensed aqueous solution (having a total amount of 8 ml), and distilled water was added to make the total amount 15 ml. After the aqueous solution was stirred using a magnetic stirrer, $Na_2SO_4$ was dissolved. Thus, it was known that since 0.02 mol of Mn(II)-polyethyleneimine complex and 0.02 mol of $Na_2SO_4$ were dissolved in the aqueous solution having a total amount of 15 ml, the solubility of the Mn(II)-polyethyleneimine complex in the aqueous solution dissolving the Mn(II)-polyethyleneimine complex and $Na_2SO_4$ as a conducting salt at a molar ratio of 1:1 is 1.33 mol/L or more. In this way, it was known that a cathode electrolyte containing the Mn(II)-polyethyleneimine complex is suitably used for the redox flow battery even in the case where a conducting salt is used.

Comparative Example 1

Except that 0.10 mol (5.85 g) of NaCl was added in place of $Na_2SO_4$ as the conducting salt, an aqueous solution containing Mn(II)-polyethyleneimine complex in a concentration of 0.2 mol/L was prepared by the same processes as in Example 1.

Next, after the resulting aqueous solution was electrolytically oxidized to prepare a cathode electrolyte, chlorine gas occurred from the aqueous solution. Accordingly, it was known that if a large number (1 mol/L in this case) of chlorine ions are contained in the cathode electrolyte, when the manganese ions are being oxidized, the oxidation reaction of manganese is interfered with and chlorine gas occurs.

Comparative Example 2

Except that the charge/discharge cell as well as the cathode electrolyte tank and the anode electrolyte tank were exposed to the atmosphere after the charging in the self-discharge test, the self-discharge test was carried out by the same processes as in Example 1. As a result, it was known that if a large amount (~20% of the atmosphere) of oxygen is contained in the gas contacting a liquid surface of the cathode electrolyte, the redox flow battery discharges itself (very fast).

Comparative Example 3

Except that the following aqueous solution was used as the cathode electrolyte, the self-discharge test was carried out by the same processes as in Example 1.

Firstly, 0.02 mol (3.38 g) of $MnSO_4.H_2O$ was added to and dissolved in 50 ml of distilled water. Next, 0.02 mol (8.32 g) of EDTA(4Na).$2H_2O$ (tetrasodium salt of EDTA) was added to and dissolved in the aqueous solution, and then 0.05 mol (7.1 g) of $Na_2SO_4$ was added and dissolved. Next, distilled water was added to make the total amount 100 ml. Thus, an aqueous solution having a concentration of Mn(II)-EDTA complex of 0.2 mol/L was prepared. Then, except that the above aqueous solution was used as the cathode electrolyte, the self-discharge test was carried out by the same processes as in Example 1.

As a result, the voltage of the cathode electrolyte after the charging was 0.55 V, and the voltage after an overnight standing was 0.30 V. Accordingly, it was known that a redox flow battery using the cathode electrolyte containing EDTA (4Na).$2H_2O$ as a polyaminocarboxylic acid in place of polyethyleneimine discharges itself (very fast).

In addition, during the overnight standing, occurrence of carbon dioxide gas (occurrence of bubbles) in the cathode electrolyte was recognized. The phenomenon was consistent with that mentioned in Non-Patent Document 2. Thus, it is conceivable that the EDTA as a ligand was oxidized and decomposed itself.

Comparative Example 4

Except that the following aqueous solution was used as the cathode electrolyte, the self-discharge test was carried out by the same processes as in Example 1.

Firstly, 0.02 mol (3.38 g) of $MnSO_4.H_2O$ was added to and dissolved in 70 ml of distilled water. Next, 0.02 mol (5.56 g) of EDTA-OH and 0.06 mol (2.4 g) of NaOH were added to and dissolved in the aqueous solution little by little, and then 0.05 mol (7.1 g) of $Na_2SO_4$ was added and dissolved. Next, distilled water was added to make the total amount 100 ml. In this way, an aqueous solution having a concentration of Mn(II)-EDTA-OH complex of 0.2 mol/L was prepared. Then, except that the above aqueous solution was used as the cathode electrolyte, a self-discharge test was carried out by the operations of Example 1.

As a result, the voltage of the cathode electrolyte after the charging was 0.48 V, and the voltage after an overnight standing was 0.40 V. Accordingly, it was known that a redox flow battery using the cathode electrolyte containing EDTA-OH as a polyaminocarboxylic acid in place of polyethyleneimine discharges itself (very fast).

Comparative Example 5

Firstly, 0.02 mol (2.96 g) of disodium malonate was added to and dissolved in 70 ml of distilled water, and then dilute sulfuric acid having a concentration of 2.5 mol/L was dripped thereto to adjust the pH to 7. Next, 0.02 mol (3.38 g) of $MnSO_4.H_2O$ was added to and dissolved in the aqueous solution, and then 0.05 mol (7.1 g) of $Na_2SO_4$ was added and dissolved. Next; distilled water was added to make the total amount 100 ml. Thus, it was known that though an attempt was made to prepare an aqueous solution with a concentration of Mn(II)-malonic acid complex of 0.2 mol/L, manganese compound is immediately deposited. Accordingly, it was known that if malonic acid as a polycarboxylic acid is used instead of polyethyleneimine, it is impossible to prepare a cathode electrolyte containing a Mn(II) complex in a sufficient concentration.

Comparative Example 6

Firstly, 0.02 mol (3.24 g) of disodium succinate was added to and dissolved in 70 ml of distilled water, and then dilute sulfuric acid having a concentration of 2.5 mol/L was dripped thereto to adjust the pH to 7. Next, 0.02 mol (3.38 g) of $MnSO_4.H_2O$ was added to and dissolved in the aqueous solution, and then 0.05 mol (7.1 g) of $Na_2SO_4$ was added and dissolved. Next, distilled water was added to make the total amount 100 ml. Thus, it was known that though an attempt was made to prepare an aqueous solution having a concentration of Mn(II)-succinic acid complex of 0.2 mol/L, a manganese compound was immediately deposited. Accordingly, it was known that if succinic acid as a polycarboxylic acid is used instead of polyethyleneimine, it is impossible to prepare a cathode electrolyte containing a Mn(II) complex at a sufficient concentration.

Comparative Example 7

Except that the following aqueous solution was used as the cathode electrolyte, the self-discharge test was carried out by the same processes as in Example 1.

Firstly, 0.02 mol (2.68 g) of DL-malic acid was added to and dissolved in 70 ml of distilled water, and then 0.04 mol (1.6 g) of NaOH was added and dissolved. Next, dilute sulfuric acid having a concentration of 2.5 mol/L was dripped into the aqueous solution to adjust the pH to 7. Thereafter, 0.02 mol (3.38 g) of $MnSO_4.H_2O$ was added to and dissolved in the above aqueous solution, and then 0.05 mol (7.1 g) of $Na_2SO_4$ was added and dissolved. Next, distilled water was added to make the total amount 100 ml. Thus, an aqueous solution having a concentration of Mn(II)-DL-malic acid complex of 0.2 mol/L was prepared. Then, except that the above aqueous solution was used as the cathode electrolyte, a self-discharge test was carried out by the operations of Example 1.

As a result, the voltage of the cathode electrolyte after the charging was 0.54 V, and the voltage after an overnight standing was 0.27 V. Accordingly, it was known that a redox flow battery using a cathode electrolyte containing DL-malic acid as a hydroxy acid instead of polyethyleneimine discharges itself (very fast).

Comparative Example 8

Except that the following aqueous solution was used as the cathode electrolyte, the self-discharge test was carried out by the same operations of Example 1.

Firstly, 0.02 mol (4.20 g) of citric acid was added to and dissolved in 70 ml of distilled water, and then 0.06 mol (2.4 g) of NaOH was added and dissolved. Next, dilute sulfuric acid having a concentration of 2.5 mol/L was dripped into this aqueous solution to adjust the pH to 7. Thereafter, 0.02 mol (3.38 g) of $MnSO_4.H_2O$ was added to and dissolved in the aqueous solution, and then 0.05 mol (7.1 g) of $Na_2SO_4$ was added and dissolved. Next, distilled water was added to make the total amount 100 ml. Thus, an aqueous solution having a concentration of Mn(II)-citric acid complex of 0.2 mol/L was prepared. Then, except that the above aqueous solution was used as the cathode electrolyte, a self-discharge test was carried out by the same operations of Example 1.

As a result, the voltage of the cathode electrolyte after the charging was 0.51 V, and the voltage after an overnight standing was 0.20 V. Accordingly, it was known that a redox flow battery using the cathode electrolyte containing citric acid as a hydroxy acid instead of polyethyleneimine discharges itself (very fast).

Comparative Example 9

Firstly, 0.02 mol (1.2 g) of ethylenediamine was added to and dissolved in 70 ml of distilled water, and then dilute sulfuric acid having a concentration of 2.5 mol/L was dripped in to adjust the pH to 7. Next, 0.02 mol (3.38 g) of $MnSO_4.H_2O$ was added to and dissolved in the aqueous solution, and then 0.05 mol (7.1 g) of $Na_2SO_4$ was added and dissolved. Next, distilled water was added to make the total amount 100 ml. Thus, it was known that though an attempt was made to prepare an aqueous solution having a molar ratio of manganese to ethylenediamine of 1:1 and having a concentration of Mn(II)-ethylenediamine complex of 0.2 mol/L, a manganese compound is deposited immediately. Accordingly, it was known that if ethylenediamine is used instead of polyethyleneimine, it is impossible to prepare a cathode electrolyte containing a Mn(II) complex at a sufficient concentration.

Comparative Example 10

Except that the following aqueous solutions were used as the anode electrolyte and the cathode electrolyte, a self-discharge test was done by the operations of Example 2.

The anode electrolyte was prepared as follows. Firstly, 0.1 mol (6.0 g) of ethylenediamine was added to and dissolved in 70 ml of distilled water. Next, dilute sulfuric acid having a concentration of 2.5 mol/L was dripped into the solution to adjust the pH to 7. Then, 0.02 mol (3.19 g) of $CuSO_4$ was added to and dissolved in the above aqueous solution, and then 0.05 mol (7.1 g) of $Na_2SO_4$ (conducting salt) was added and dissolved. Next, distilled water was added to make the total amount 100 ml, thus preparing an aqueous solution having a molar ratio of copper to ethylenediamine of 1:5 and having a concentration of Cu(II)-ethylenediamine complex of 0.2 mol/L.

Meanwhile, the cathode electrolyte was prepared as follows. Firstly, 0.1 mol (6.0 g) of ethylenediamine was added to and dissolved in 70 ml of distilled water. Next, dilute sulfuric acid having a concentration of 2.5 mol/L was dripped into the aqueous solution to adjust the pH to 7. Then, 0.02 mol (3.38 g) of $MnSO_4.H_2O$ was added to and dissolved in the aqueous solution, and then 0.05 mol (7.1 g) of $Na_2SO_4$ (conducting salt) was added and dissolved. Next, distilled water was added to make the total amount 100 ml. In this way, an aqueous solution having a molar ratio of manganese to ethylenediamine of 1:5 and having a concentration of Mn(II)-ethylenediamine complex of 0.2 mol/L was prepared. Moreover, no manganese compound was deposited.

A charge/discharge test of the redox flow battery was carried out using the above cathode electrolyte and anode electrolyte under the same conditions of Example 2. However, the charge/discharge test was carried out with the charging being performed at a constant current of 100 mA with a cut-off voltage set to 2.0 V. The discharging was performed at a constant current of 100 mA with a cut-off voltage set to 0.3 V.

It is conceivable that the redox reaction at the cathode side is "Mn(II)-ethylenediamine complex ⇔ Mn(III)-ethylenediamine complex+e⁻," and that at the anode side is "Cu(II)-ethylenediamine complex+e⁻ ⇔ Cu(I)-ethylenediamine complex."

Figure 13:
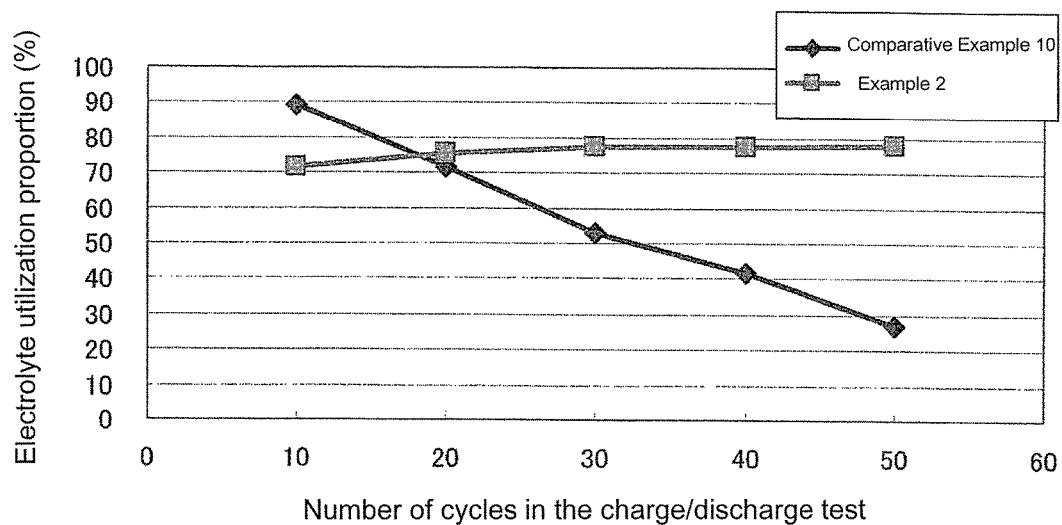
FIG. 13 is a graph showing the "electrolyte utilization proportion" of the redox flow battery of Example 2 and the "electrolyte utilization proportion" of the redox flow battery of Comparative Example 10.

As a result, there was no big difference between any of the numerical values of "electromotive force," "coulombic efficiency," "voltage efficiency" and "energy efficiency" and the numerical values in Example 2. However, in contrast to Example 2 where the redox flow battery was not substantially reduced in capacity even after the charge/discharge cycle was repeated 50 times (50 cycles), the redox flow battery of Comparative Example 10 was reduced in capacity after the charge/discharge cycle was repeated 50 times (50 cycles). That is to say, as shown in FIG. 13, in contrast to the "electrolyte utilization proportion" of the redox flow battery of Example 2 that did not substantially vary even after the charge/discharge cycle was repeated 50 times (50 cycles), the "electrolyte utilization proportion" of the redox flow battery of Comparative Example 10 remarkably dropped with repetition of charge/discharge. That is to say, as compared to the redox flow battery of Example 2, the redox flow battery of Comparative Example 10 was inferior in "charge/discharge cycling characteristic (reversibility)" and "electrolyte utilization proportion." Thus, it was known that the redox flow battery of Comparative Example 10 does not have sufficient durability for practical applications in a wide range of fields as an energy storage battery.

In addition, after the charge/discharge test was completed, the charge/discharge cell of the redox flow battery was disassembled, and the carbon felt (GFA5 made by SGL Group) as the cathode and the anode and the collector plates were observed. As a result, a large amount of deposition of a manganese compound was recognized at the cathode side, and a large amount of deposition of a copper compound recognized at the anode side. It was also known from this that the redox flow battery of Comparative Example 10 does not have sufficient durability for practical applications in a wide range of fields as an energy storage battery. Moreover, in the redox flow battery of Example 2, almost none of the above deposition was recognized.

Further, by comparing the safety of polyethyleneimine (by Wako Pure Chemical Industries, Ltd., with an average molecular weight of 600) and that of ethylenediamine, as mentioned in Non-Patent Documents 3 and 4, polyethyleneimine is classified as dangerous goods under Class 4, Petroleum Type 4, having a flash point of 248° C. (in Cleveland open-cup) and an acute toxicity (oral; in rats; LD50) of 1350 mg/kg. By contrast, ethylenediamine is classified as dangerous goods under Class 4, Petroleum Type 2, having a flash point of 34° C. (in a closed cup) and an acute toxicity (oral; in rats; LD50) of 500 mg/kg. Accordingly, it was known that in terms of operability or acute toxicity as dangerous goods, the redox flow battery of Comparative Example 10 was inferior to the redox flow battery of Example 2.

The invention is not limited to the embodiments described above, and may be modified in various ways within the scope of the claims. An embodiment derived from a proper combination of technical means disclosed in respective different embodiments is also encompassed in the technical scope of the invention.

INDUSTRIAL APPLICABILITY

With this invention, an energy storage battery capable of preventing precipitation of a manganese compound and preventing self-discharge thereof, and also having an improved reactivity of manganese ion can be provided. Accordingly, there is an effect that an energy storage battery using a manganese-based redox material and having a sufficient durability for practical applications in a wide range of fields can be provided.

Hence, the energy storage battery of this invention not only may be used by electric power companies, but also may be ubiquitously utilized in various industries requiring energy storage.

What is claimed is:

1. An energy storage battery, being a redox type energy storage battery, and being characterized in that a cathode electrolyte thereof is an aqueous solution containing a Mn-based redox material as a cathode active material and also containing polyethyleneimine.

2. The energy storage battery of claim 1, wherein a molar ratio of manganese ions to nitrogen atoms contained in the polyethyleneimine is in a range of 1:1 to 1:5.

3. The energy storage battery of claim 1, wherein a concentration of a Mn-polyethyleneimine complex contained in the cathode electrolyte ranges from 0.2 mol/L to 2.5 mol/L.

4. The energy storage battery of claim 1, wherein a pH of the cathode electrolyte is in a range of 2 to 7.

5. The energy storage battery of claim 1, wherein the Mn-based redox material is manganese sulfate.

6. The energy storage battery of claim 1, wherein the cathode electrolyte is electrolytically oxidized.

7. The energy storage battery of claim 1, wherein the cathode electrolyte is shielded from oxygen in the atmosphere.

8. The energy storage battery of claim 1, wherein an anode electrolyte solution thereof is an aqueous solution containing a Fe-based redox material as an anode active material.

9. The energy storage battery of claim 8, wherein the anode electrolyte is an aqueous solution containing a Fe-diethylene triamine pentaacetic acid complex.

10. The energy storage battery of claim 8, wherein the anode electrolyte is electrolytically oxidized.

11. The energy storage battery of claim 1, which is a redox flow battery.

* * * * *